US012659707B2

(12) United States Patent (10) Patent No.: US 12,659,707 B2

Roy (45) Date of Patent: Jun. 16, 2026

(54) VEHICLE-TO-VEHICLE COMMUNICATION SYSTEM AND METHOD

(71) Applicant: Matthew MacGregor Roy, Montreal (CA)

(72) Inventor: Matthew MacGregor Roy, Montreal (CA)

(*) Notice: Subject to any disclaimer, the term of this patent is extended or adjusted under 35 U.S.C. 154(b) by 0 days.

(21) Appl. No.: 19/089,194

(22) Filed: Mar. 25, 2025

(65) Prior Publication Data

US 2025/0227441 A1 Jul. 10, 2025

Related U.S. Application Data

(63) Continuation of application No. 18/460,684, filed on Sep. 4, 2023, now Pat. No. 12,284,580.

(60) Provisional application No. 63/519,317, filed on Aug. 14, 2023.

(51) Int. Cl.
| | |
|---|---|
| *H04W 4/46* | (2018.01) |
| *B60Q 1/50* | (2006.01) |
| *G06F 3/01* | (2006.01) |
| *G06T 19/00* | (2011.01) |
| *G06V 20/58* | (2022.01) |
| *G06V 20/62* | (2022.01) |

(52) U.S. Cl.
CPC .............. *H04W 4/46* (2018.02); *B60Q 1/543* (2022.05); *G06F 3/013* (2013.01); *G06T 19/006* (2013.01); *G06V 20/58* (2022.01); *G06V 20/625* (2022.01)

(58) Field of Classification Search
CPC H04W 4/46; H04W 4/40; H04W 4/90; B60Q 1/543; G06F 3/013; G06T 19/006; G06V 20/58; G06V 20/625; G06V 20/597
See application file for complete search history.

(56) References Cited

U.S. PATENT DOCUMENTS

| | | | |
|---|---|---|---|
| 2020/0204966 A1* | 6/2020 | Thagadur Shivappa | .................... H04W 4/40 |
| 2024/0298154 A1* | 9/2024 | Tian | ......................... H04W 4/46 |
| 2025/0124746 A1* | 4/2025 | Naserian | ................ G07C 5/008 |

* cited by examiner

*Primary Examiner* — Thomas S Mccormack

(57) ABSTRACT

A vehicle has a Global Satellite Navigation System receiver to determine a current location, a microphone to capture a voice command of a user and a processor executing a speech recognition module to process the voice command to determine that the user is requesting that a call be initiated a nearby vehicle and to determine from the voice command of the user a visual identification of the nearby vehicle to call. The vehicle includes a radiofrequency cellular transceiver cooperating with the processor to transmit the visual identification of the nearby vehicle and the current location to the remote server and to receive from the remote server a communication-availability of the nearby vehicle. The processor cooperates with the radiofrequency cellular transceiver or with a short-range vehicle-to-vehicle transceiver of the vehicle to initiate a voice communication with the one of the nearby vehicles with which the user wishes to initiate the call.

20 Claims, 28 Drawing Sheets

| Vehicle | Availability | Rating |
|---|---|---|
| A | Y | 96% |
| B | N | 83% |
| C | N | 98% |
| D | N | 97% |
| E | Y | 87% |
| F | Y | 59% |

THIS VEHICLE IS ALREADY ON AN ANOTHER CALL

600

400

THIS VEHICLE IS NOT ACCEPTING CALLS

SEND EMERGENCY MESSAGE!

600

610

400

Add to
Contacts

Upload
recording

Rate

750

740

730

John Smith thanks you for taking his call

VEHICLE-TO-VEHICLE COMMUNICATION SYSTEM AND METHOD

CROSS-REFERENCE TO RELATED APPLICATIONS

This application is a continuation of U.S. patent application Ser. No. 18/460,684 entitled "GAZE-BASED VEHICLE-TO-VEHICLE COMMUNICATION SYSTEM AND METHOD" filed Sep. 4, 2023 which claims priority from U.S. Provisional Patent Application 63/519,317 filed Aug. 14, 2023, which is hereby incorporated by reference.

TECHNICAL FIELD

The present invention relates generally to vehicles and, in particular, to vehicle-to-vehicle communications systems.

BACKGROUND

In many instances it is desirable for an occupant of one vehicle to communicate with an occupant of another vehicle. Traditionally, an occupant of one vehicle may wave or gesticulate at the other occupant, may honk a horn, or flash headlights. These forms of communications may be misunderstood or misconstrued as rude. If the vehicles are close, the occupants of the vehicles may lower their windows to speak audibly although it may be difficult to hear if the vehicle are not very close. In other instances, the occupants know each and may initiate a cellular telephone call to speak to each other. There is a need for an improved and more efficient means of communicating between occupants of vehicles.

SUMMARY

In general, embodiments of the present invention provide a vehicle-to-vehicle communication system and method. The vehicle receives a voice command identifying a nearby vehicle to call, obtains communication availability data from a remote server and, if the nearby vehicle is accepting communications, initiates communication with the nearby vehicle.

An aspect of the disclosure is a vehicle comprising a Global Satellite Navigation System (GNSS) receiver to determine a current location of the vehicle and a radiofrequency cellular transceiver cooperating with the processor to transmit the current location of the vehicle to a remote server and to receive a communication-availability reply message from the remote server providing visual identification data and communication availability data for nearby vehicles. The vehicle includes a microphone to capture a voice command of a user. The vehicle further includes a processor executing a speech recognition module to process the voice command from the user to determine that the user is requesting that a call be initiated with one of the nearby vehicles and to determine a relative position of the one of the nearby vehicles from the voice command of the user. The vehicle also includes a camera capturing images of the nearby vehicles, wherein the processor cooperates with the camera to identify the one of the nearby vehicles with which the user wishes to initiate the call by correlating the relative position with the visual identification data. The processor cooperates with the radiofrequency cellular transceiver or with a short-range vehicle-to-vehicle transceiver of the vehicle to initiate a voice communication with the one of the nearby vehicles with which the user wishes to initiate the call.

Another aspect of the disclosure is a vehicle comprising a Global Satellite Navigation System (GNSS) receiver to determine a current location of the vehicle and a radiofrequency cellular transceiver cooperating with the processor to transmit the current location of the vehicle to a remote server and to receive a communication-availability reply message from the remote server providing visual identification data and communication availability data for nearby vehicles. The vehicle includes a microphone to capture a voice command of a user. The vehicle includes a processor executing a speech recognition module to process the voice command from the user to determine that the user is requesting that a call be initiated with one of the nearby vehicles and to determine from the voice command of the user a user-specified visual identification of the one of the nearby vehicles to call. The vehicle further includes a camera capturing images of the nearby vehicles, wherein the processor cooperates with the camera to identify the one of the nearby vehicles with which the user wishes to initiate the call by correlating the user-specified visual identification with the visual identification data from the remote server. The processor cooperates with the radiofrequency cellular transceiver or with a short-range vehicle-to-vehicle transceiver of the vehicle to initiate a voice communication with the one of the nearby vehicles with which the user wishes to initiate the call.

Yet another aspect of the disclosure is a vehicle comprising a Global Satellite Navigation System (GNSS) receiver to determine a current location of the vehicle, a microphone to capture a voice command of a user, and a processor executing a speech recognition module to process the voice command from the user to determine that the user is requesting that a call be initiated a nearby vehicle and to determine from the voice command of the user a visual identification of the nearby vehicle to call. The vehicle includes a radiofrequency cellular transceiver cooperating with the processor to transmit the visual identification of the nearby vehicle and the current location to the remote server and to receive from the remote server a communication-availability of the nearby vehicle. The processor cooperates with the radiofrequency cellular transceiver or with a short-range vehicle-to-vehicle transceiver of the vehicle to initiate a voice communication with the one of the nearby vehicles with which the user wishes to initiate the call.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present invention will become apparent from the following detailed description, taken in combination with the appended drawings, in which:

FIG. 14 depicts an information-displaying windshield notifying the occupant of the vehicle that the occupant of the nearby vehicle is not accepting calls.

FIG. 20 depicts the information-displaying windshield presenting user interface elements to rate the caller, upload a recording of the call, and to add the caller to a contacts list.

It will be noted that throughout the appended drawings, like features are identified by like reference numerals.

DETAILED DESCRIPTION

Figure 1:
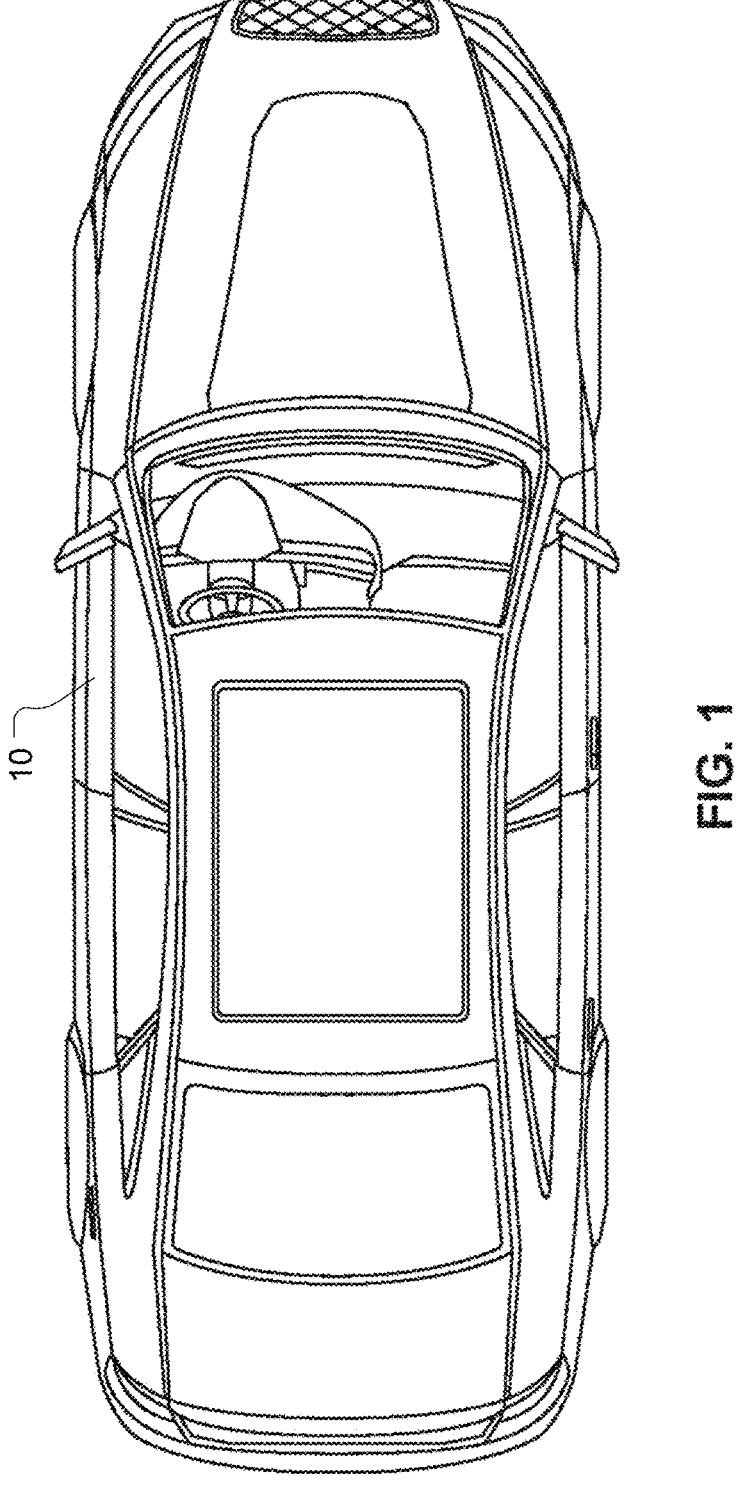
FIG. 1 is a top view of a vehicle in accordance with an embodiment of the present invention.
Figure 2:
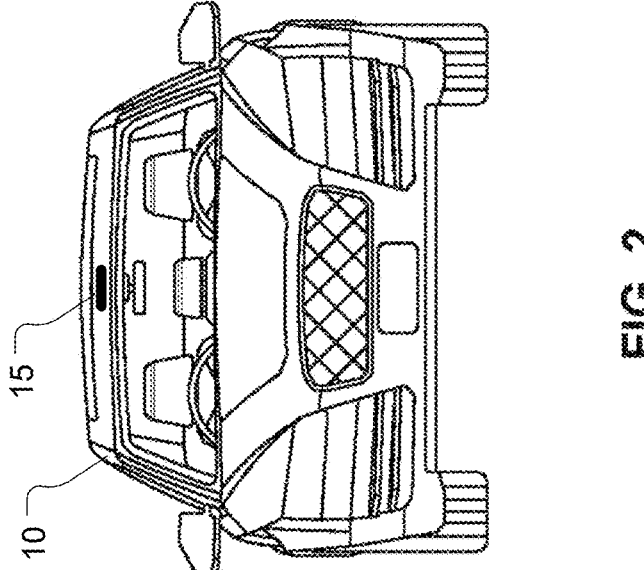
FIG. 2 is a front view of the vehicle of FIG. 1.
Figure 3:
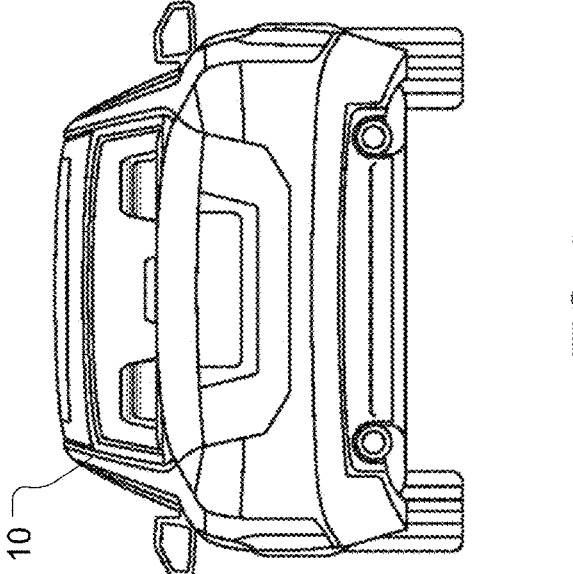
FIG. 3 is a rear view of the vehicle of FIG. 1.

Disclosed herein are various embodiments of a vehicle for gaze-based vehicle-to-vehicle communication that enables an occupant of one vehicle to speak to the occupant of another nearby vehicle.

FIGS. 1-5 depict one exemplary implementation of a vehicle 10. The embodiments of this invention may be applied or adapted to an autonomous (self-driving) vehicle or applied or adapted to a human-driven vehicle or a mixed-mode vehicle that has an assisted-driving system for partially driving the vehicle 10 in conjunction with driver input. The vehicle 10 may have an internal combustion engine, be purely electric or hybrid-electric. The vehicle may be powered by another technology like a hydrogen fuel cell. The vehicle 10 includes, in the illustrated embodiment, a vehicle chassis 12, and a plurality of wheels 13. The chassis may include or support a body 11. The chassis is any frame or structure that supports the passenger cabin and battery. The vehicle 10 includes an internal combustion engine or electric motor supported by the chassis and mechanically connected to one or more of the wheels for providing traction to the one or more of the wheels. The vehicle 10 includes a braking system and a steering system for steering the vehicle via a steering mechanism. The vehicle may include a powertrain to transfer power from the motor to the drive wheels. For some vehicles, the powertrain may include, in addition to the motor (engine), a transmission gearbox, a drive shaft, and a differential.

For the purposes of this specification, the term "vehicle" is meant to encompass any land-based vehicle such as a car (sedan, station wagon, hatchback, etc.), van, minivan, sports utility vehicle (SUV), crossover-type vehicle, bus, minibus, truck, tractor-trailer, semi-trailer.

The terms "autonomous vehicle" and "self-driving vehicle" are meant to synonymously encompass any vehicle having environment-detecting sensors and a processor 100 or other controller, computer, computing device or computer system for autonomously steering, accelerating and braking the vehicle, i.e. self-driving or driving autonomously, without a driver physically touching, interacting with or providing input to the steering wheel, accelerator pedal and brake pedal. The vehicle of FIGS. 1-5 also includes a plurality of sensors i.e. environment-detecting sensors. The sensors may include RADAR, LIDAR, cameras and ultrasonic rangefinders. The processor 100 is configured to receive analog or digital signals (data) from the sensors and to generate steering, acceleration and braking control signals for controlling the steering system, the motor and the braking system of the vehicle. The processor may generate a steering control signal, an acceleration control signal and a braking control signal based on the signals received from the sensors. The processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a sunroof open signal, a sunroof close signal, a climate control signal, a seat heater signal, a windshield defroster signal, a windshield wiper activation signal, a wiper fluid squirt signal, to name but a few.

The processor 100 may be any microprocessor, computer, computing device, or microcontroller. As will be appreciated, in a variant, there may be multiple processors or computers working together, e.g. networked together via data buses, communication cables, or wireless links to share computational loads or to perform different tasks. In one embodiment, as depicted by way of example in FIGS. 1-5, the vehicle comprises a self-driving computer or computing device that has a microprocessor (e.g. processor 100) operatively coupled to a memory 102, e.g. a flash memory and/or random access memory (RAM). The memory may store system data, configuration files and user-related data. There may be multiple memory devices in the vehicle. In a variant, data may be stored in a cloud-based memory accessible by the vehicle.

The processor 100 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processor may be part of a computing system that includes a chipset for controlling communications between the one or more processors and one or more of the other components of the system. The one or more processors may also include one or more application-specific integrated circuits (ASICs) or application-specific standard products (ASSPs) for handling specific data processing functions or tasks.

The memory 102 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or any suitable combination thereof.

Figure 4:
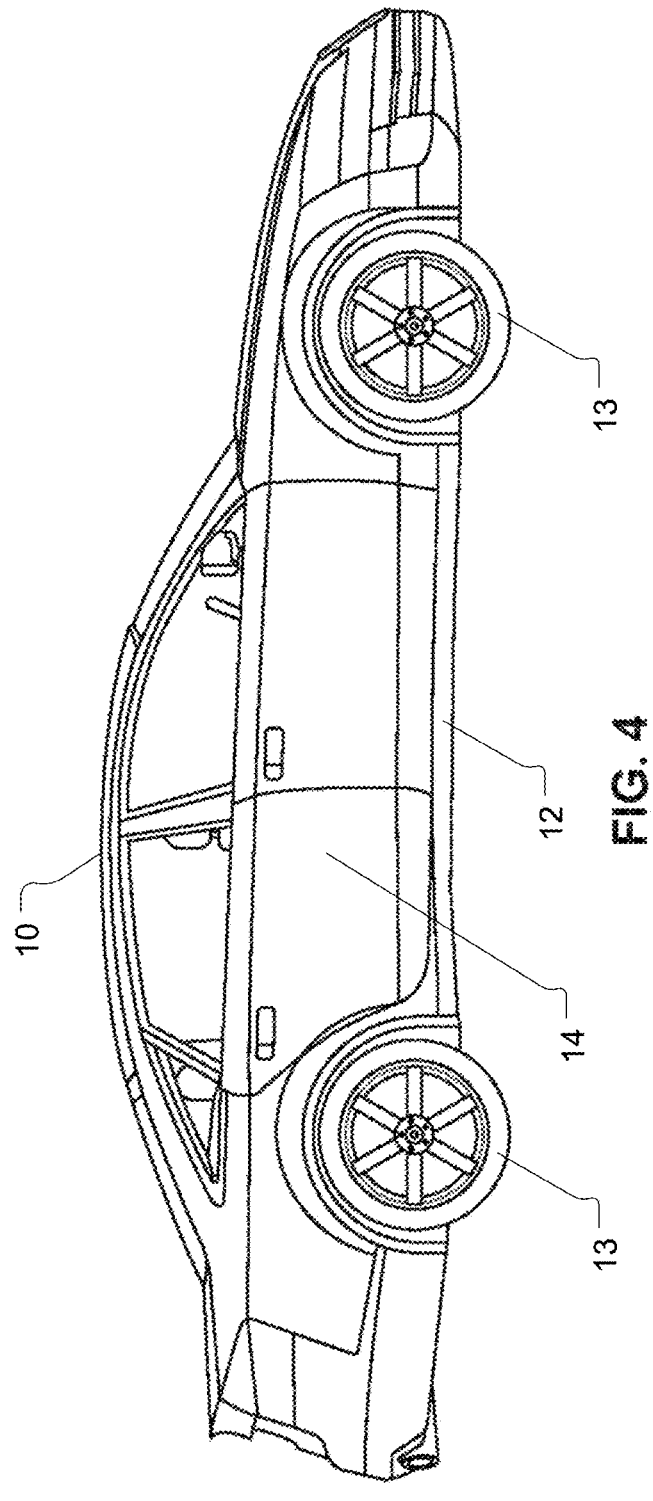
FIG. 4 is a right side view of the vehicle of FIG. 1.
Figure 5:
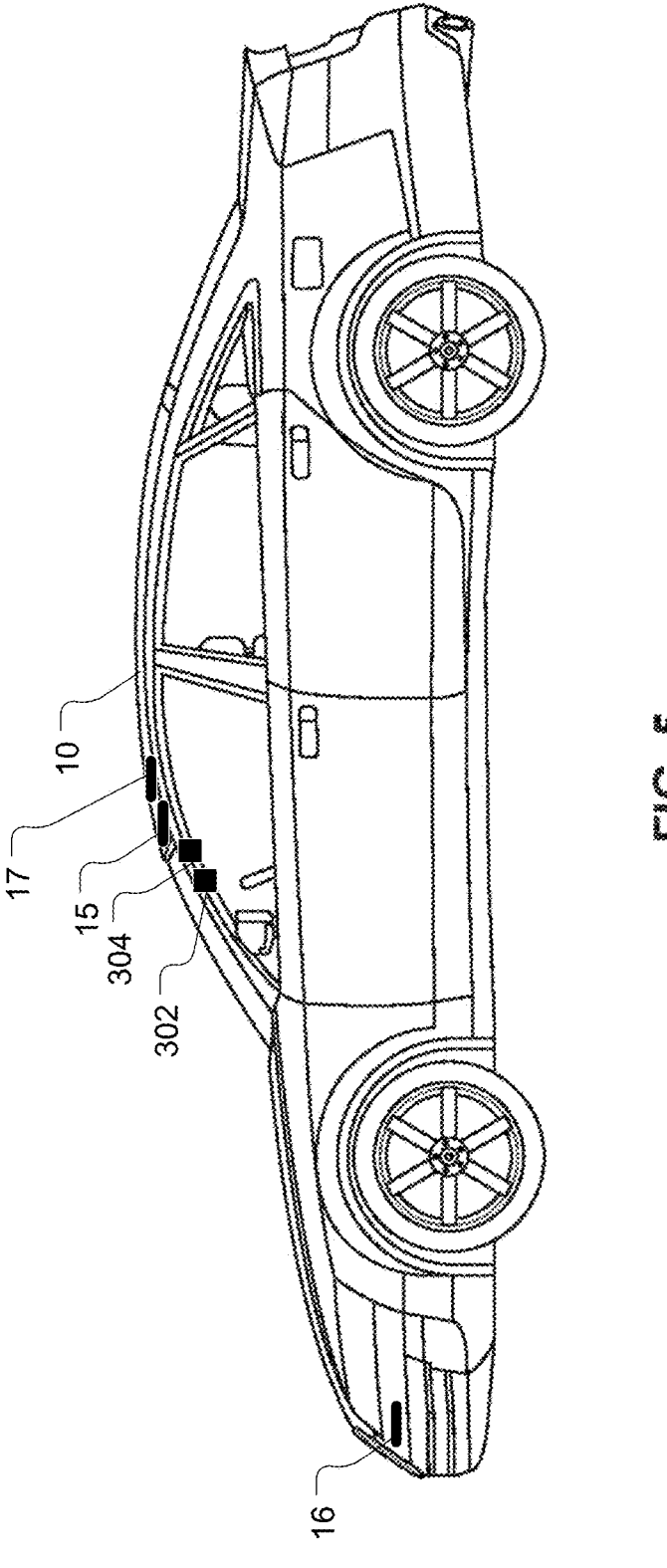
FIG. 5 is a left side view of the vehicle of FIG. 1.
Figure 6:
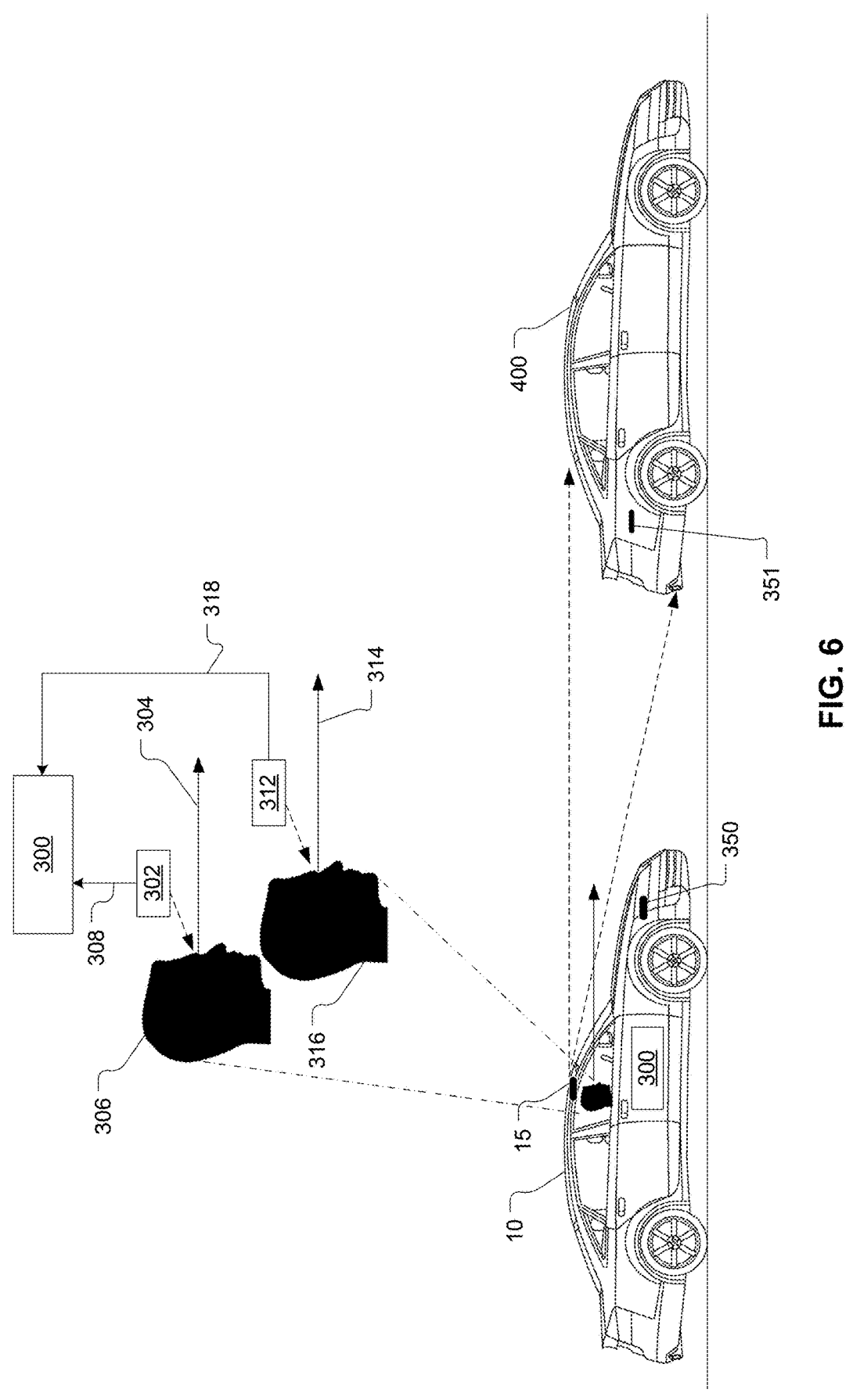
FIG. 6 depicts a vehicle having eye trackers for tracking the gaze of two occupants of the vehicle.

As depicted in FIGS. 4, 5 and 6, the vehicle 10 includes a radiofrequency data transceiver 110 (radiofrequency cellular transceiver), e.g. a wireless data transceiver for transmitting and receiving data wirelessly. In one embodiment, the data transceiver 110 is a cellular data transceiver. The data transceiver 110 is configured to wirelessly communicate data from the vehicle to the remote control device by attaching communicatively to a base transceiver station 150 as shown in FIG. 6. Data is transmitted and received over a cellular wireless network using cellular communication protocols and standards for packet data transfer such as GSM, CDMA, GPRS, EDGE, UMTS, LTE, 5G, etc. The vehicle may include a Subscriber Identity Module (SIM) card for GSM-type communications or a Re-Usable Identification Module (RUIM) card for CDMA-type communications. From the base transceiver station 150 the data is communicated via the internet 200 to a server 250 (remote server) or a plurality of servers as depicted in FIG. 6. As described below, the remote server 250 stores information about vehicles, particularly information regarding the communication availability or communication unavailability of nearby vehicles. In addition, the server(s) may provide traffic data, road condition data, weather data, etc.

The vehicle 10 in the embodiment depicted in FIG. 6 further includes a Global Navigation Satellite System (GNSS) receiver 120 for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including Beidou (COMPASS), Galileo, GLO-NASS, IRNSS, and QZSS.

The Society of Automotive Engineers (SAE) has defined multiple levels of autonomous vehicle operation. At levels 0-2, a human driver monitors or controls the majority of the driving tasks, primarily without assistance from the vehicle. For example, at level 0 ("no automation"), a human driver is responsible for all vehicle operations. At level 1 ("driver assistance"), the vehicle occasionally assists with steering, acceleration, or braking, but the driver is still responsible for the vast majority of the vehicle control. At level 2 ("partial automation"), the vehicle controls steering, acceleration, and braking under certain circumstances without human interaction. At levels 3-5, the vehicle assumes more driving-related tasks. At level 3 ("conditional automation"), the vehicle handles steering, acceleration, and braking under certain circumstances as well as monitoring of the driving environment. Level 3 only requires the driver to intervene occasionally. At level 4 ("high automation"), the vehicle handles the same tasks as at level 3 but without relying on the driver to intervene in certain driving modes. At level 5 ("full automation"), the vehicle handle all, or almost all, tasks without any driver intervention.

In at least some of the embodiments of the present invention, as depicted in FIGS. 1-5, the vehicle 10 includes a chassis 12, a plurality of wheels 13 rotationally mounted to the chassis 12 and a body 14 supported by the chassis 12. The vehicle 10 includes a vehicle-detecting sensor 15, 16, 17 supported by the body 14 for detecting an object such as a nearby vehicle in a vicinity of the vehicle 10. The vehicle-detecting sensor 15, 16, 17 generates sensor data (e.g. image data) for the object (e.g. nearby vehicle). The vehicle-detecting sensor may be a camera 15, RADAR 16, or LIDAR 17, or any equivalent sensor. The vehicle 10 may have multiple vehicle-detecting sensors, e.g. the vehicle 10 may have the camera 15, the RADAR 16 and the LIDAR 17 or any subset thereof.

In the embodiment depicted by way of example in FIG. 6, the vehicle 10 includes a first eye tracker 302 for tracking a first gaze 304 of a first occupant 306 of the vehicle 10 and to generate first gaze direction data 308. In the embodiment depicted by way of example in FIG. 6, the vehicle 10 also includes a second eye tracker 312 for tracking a second gaze 314 of a second occupant 316 of the vehicle 10 and to generate second gaze direction data 318. A gaze processor receives and processes the first and second gaze data. Projecting the gaze directions to a point of convergence (by the gaze processor) indicates where both occupants are concurrently looking. If this point of convergence coincides with a nearby vehicle, this nearby vehicle is the focus of the gazes of the two occupants. In one embodiment, the first gaze and the second gaze must exceed a predetermined amount of time before the gaze processor concludes that the focus of the first and second occupants is the nearby vehicle. In a refinement, the eye trackers can also detect focus depth (gaze endpoint) of the occupants to determine how far the occupants are looking, e.g. at a nearby vehicle that is close by or a nearby vehicle in the same general direction but a little farther away. For example, the gaze endpoint determination technology of U.S. Pat. No. 11,676,302, which is hereby incorporated by reference, may be used, or adapted for use, to accomplish this gaze endpoint determination. Other technologies that may be used or adapted for use include U.S. Pat. Nos. 10,705,600, 10,691,391 and 9,001,153 which are all hereby incorporated by reference.

In the example of FIG. 6, the first and second occupants 306, 316 are sitting in the two front seats of the vehicle 10 although it will be appreciated that the first and second occupants 306, 316 may be seated elsewhere in the vehicle 10. Although the description and drawings disclose the nearby vehicle as being visible through the front windshield of the vehicle, it will be appreciated that the same concepts apply to a scenario in which the nearby vehicle is visible through a side window of the vehicle or even a rear window of the vehicle. Also, it should be understood that the vehicle 10 may be moving or stationary, either being driven by the first occupant 306 or the second occupant 316 or operating in an autonomous or semi-autonomous driving mode. In the embodiment depicted by way of example in FIG. 6, the vehicle 10 includes a processor 300 communicatively connected to the first eye tracker 302 and to the second eye tracker 312 to receive the first gaze direction data 304 and the second gaze direction data 314. The processor 300 is configured to compare the first gaze direction data 308 and the second gaze direction data 318 to determine if the first occupant 306 and the second occupant 316 are both gazing at a nearby vehicle 400 sensed by a vehicle-detecting sensor (also referred to herein as an environment-detecting sensor). The vehicle-detecting sensor may be a camera 15, RADAR 16 or LIDAR 17 or any combination thereof. The processor 300 is, in this illustrated embodiment, a distinct hardware component from the self-driving processor 100 introduced earlier. However, it is possible to combine the processors 100, 300 in another embodiment into a single consolidated processing unit that performs all functions. Likewise, a plurality of processors may be used to perform the functions of the processor 300.

The processor 300 is configured to identify (i.e. to determine an identification of) the nearby vehicle by optically recognizing characters of a license plate of the nearby vehicle using the camera 15, or by detecting an identification beacon broadcast by the nearby vehicle using a short-range vehicle-to-vehicle transceiver 350. The identification beacon may be broadcast by a V2V transceiver 352 of the nearby vehicle 400 and received by the V2V transceiver 350 of the vehicle 10. The identification beacon may contain any unique identifier of the nearby vehicle. Another technique described later in this specification looks up the identification of a vehicle based on its make and color, or by its make and model or by its type of vehicle (sedan, SUV, pickup, van, etc.) or by its relative location to the vehicle 10.

Figure 7:
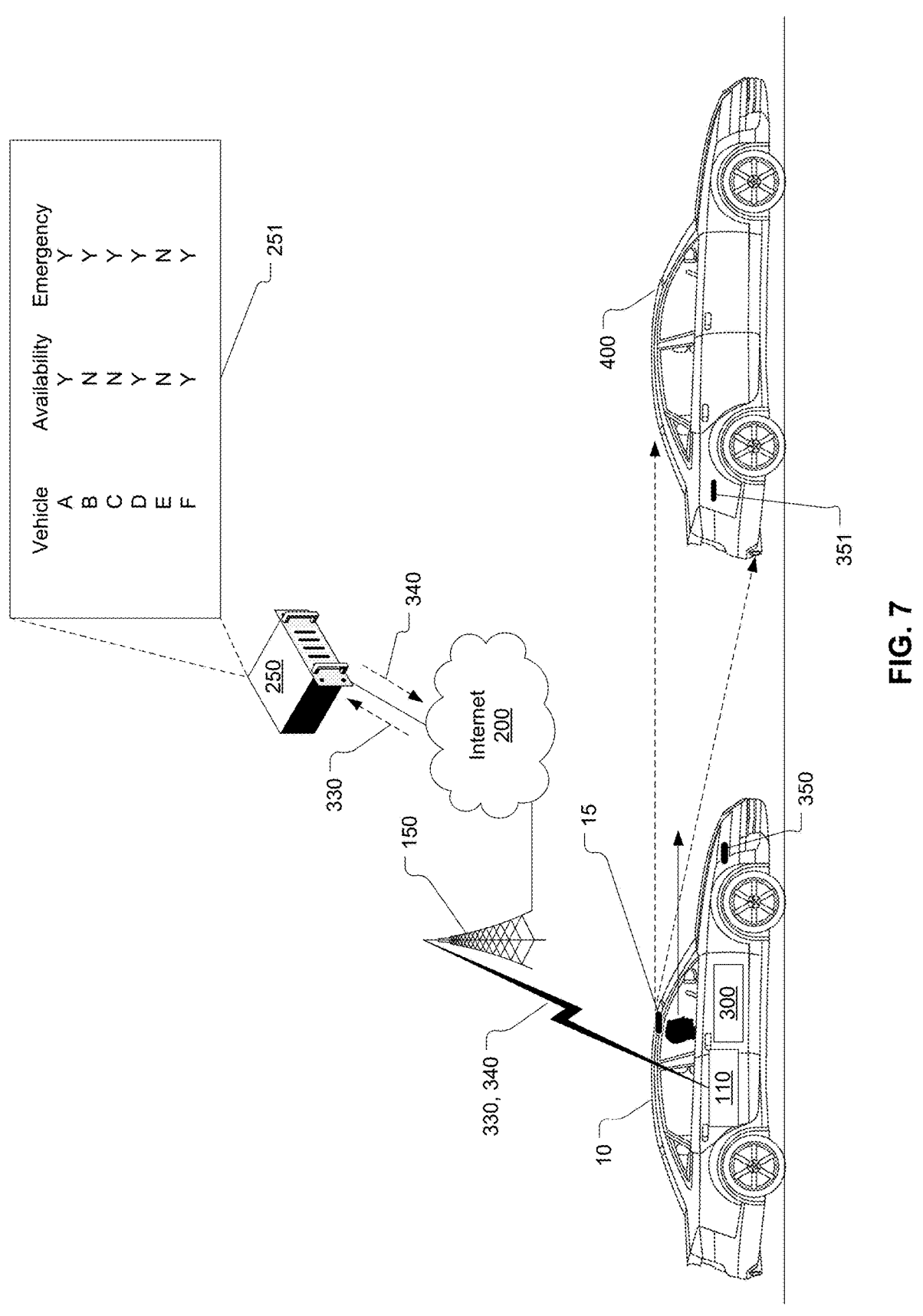
FIG. 7 depicts a vehicle looking up the identification of the nearby vehicle from a remote server.

As depicted by way of example in FIG. 7, the vehicle 10 includes a radiofrequency cellular transceiver 110 cooperating with the processor 300 to transmit a communication-availability query message 330 to a remote server 250 via the base station transceiver 150 and Internet 200 to look up the identification of the nearby vehicle 400 and to receive a communication-availability reply message 340 from the remote server 250 indicating either a communication availability or communication unavailability of the nearby vehicle 400. The query message and reply message may be datagrams of predetermined formats. The remote server 250 has a memory to store a database 251 containing identities of vehicles (e.g. identifiers of vehicles A, B, C, D, E, F) and their respective communication settings, communication preferences or privacy settings, i.e. their availability (Y for yes) or unavailability (N for no). Occupants of these nearby vehicles can configure their communication settings, communication preferences or privacy settings according to time and/or location, e.g. days of the week, times of day, particular locations such as in a home neighborhood or workplace environment. Communication settings can be configured to be unavailable for work hours e.g. during commute times in an autonomous vehicle when the occupant is working while commuting. Communication settings may be drawn from a calendar of the occupant's mobile communication device (e.g. the occupant's smart phone). In another implementation, the occupant's mood (emotional state) may be used to determine availability or unavailability. For example, the mood of the occupant may be determined by a biometric mood-inference system that uses biometric sensors to detect biometry of an occupant to infer a mood of the occupant. Biometry may include facial muscle tension, blood pressure, heart rate, pupilometer readings, etc. A privacy setting may be dynamically and automatically set based on a mood inference of the occupant. The biometric mood-inference system may calculate a mood score based on the biometry data. This biometry data may be time-adjusted for a time of day based on a corpus of past readings that suggest mood fluctuations as a function of the time of day. The remote server may store a mood threshold for availability for each occupant. If the mood inference provides a mood score below the threshold, the occupant is considered unavailable. If the mood score is above the threshold, the occupant is considered available. The biometric mood-inference system may also monitor the tone of the voice of the occupant during calls to infer the mood of the occupant. Thus, simply put, if the occupant is in a good mood, he or she may be more open to receiving a call than if the occupant is in a bad mood.

In the embodiment shown by way of example in FIG. 7, the processor 300 cooperates with the radiofrequency cellular transceiver 110 or the short-range vehicle-to-vehicle transceiver to initiate a voice communication with the nearby vehicle 400 in response to the communication-availability reply message indicating the communication availability of the nearby vehicle. The reply may alternatively indicate a communication unavailability. In other words, if the nearby vehicle replies that it is unavailable, no communication is initiated or attempted. On the other hand, if the nearby vehicle replies that it is available, then communication is initiated. In one embodiment, this is accomplished by obtaining the cellular telephone number of one of the occupants of the nearby vehicle from the remote server and initiating a cellular telephone call to the occupant of the nearby vehicle. This cellular call may be done by sharing the cell number or by concealing the cell number. Alternatively, a VoIP call may be established between the two vehicles over the cellular link as another way of setting up a voice communication. The cellular call or VoIP call over a cellular link may use Call ID to share the name and number of the incoming caller. In another embodiment, a voice link using VoIP is established using a short-range V2V communication link 354 using any suitable V2V channel between the V2V transceivers 350, 352 of the vehicle and the nearby vehicle 400. Alternatively, the voice communication, e.g. VoIP, can be established using Bluetooth®, WiFi® or any other suitable short-range telecommunication protocol. In one embodiment, even if the recipient vehicle is available, the incoming call may still be declined by the occupant(s) of the nearby vehicle (i.e. the recipient vehicle). The incoming call may, for example, go to the cell phone of an occupant in the recipient vehicle. If answered by the occupant of the recipient vehicle, the voice call is played through the vehicle speakers of the Bluetooth-connected sound system of the vehicle or through the speaker of the cell phone itself, or through earphones or a headset paired to the cell phone, all depending on the vehicle and cell phone settings. If there are multiple occupants in the vehicle, the call is routed to the occupant whose cell phone is Bluetooth-paired to the vehicle. If no cell phone is paired to the vehicle, the call is routed according to the occupant listed as the owner of the vehicle or main operator of the vehicle. If the call is not answered, the call can go to voice mail (answering service) to allow the caller to leave a message.

In the foregoing description, it should be understood that vehicle occupants (owners, passengers, riders, etc.) register their identity or their vehicle's identity with the remote server and specify their communication preferences or privacy settings (i.e. if they are willing to receive calls or not) and optionally under what circumstances and from whom. For example, a vehicle owner (who may be the occupant as well) may register his vehicle and specify that he does not wish to receive communications from strangers, only from known contacts, e.g. family, friends and work colleagues who are listed as contacts in his mobile device. Alternatively, he may specify a geofence, e.g. only within one mile of home and only during daylight hours. Alternatively, he may specify only calls from commercial vehicles (e.g. delivery vehicles, tow-trucks, taxis, etc.) or government vehicles (police cars, fire truck, ambulances, garbage trucks, road repair vehicles, etc.)

In one embodiment, which is also shown in FIG. 7, the communication-availability query message is an emergency message. In this embodiment, the remote server 250 stores a general privacy setting for determining the communication availability of the nearby vehicle and an emergency messaging setting for the nearby vehicle that is distinct from the general privacy setting. In one specific embodiment, the emergency message automatically triggers a 911 call from a mobile device of one of the first or second occupants. For example, the occupant of vehicle B is unwilling to receive a general message but is willing to receive an emergency message. An emergency message may be a message regarding highway safety, a car crash, a crime in progress, a health emergency, an extreme weather alert, a natural disaster, etc. The privacy settings may be user-configured to specify which types of events constitute an emergency. In one embodiment, certain emergency vehicles may be allowed to initiate a communication irrespective of the occupant's privacy settings, e.g. a police car, ambulance or fire truck.

Figure 8:
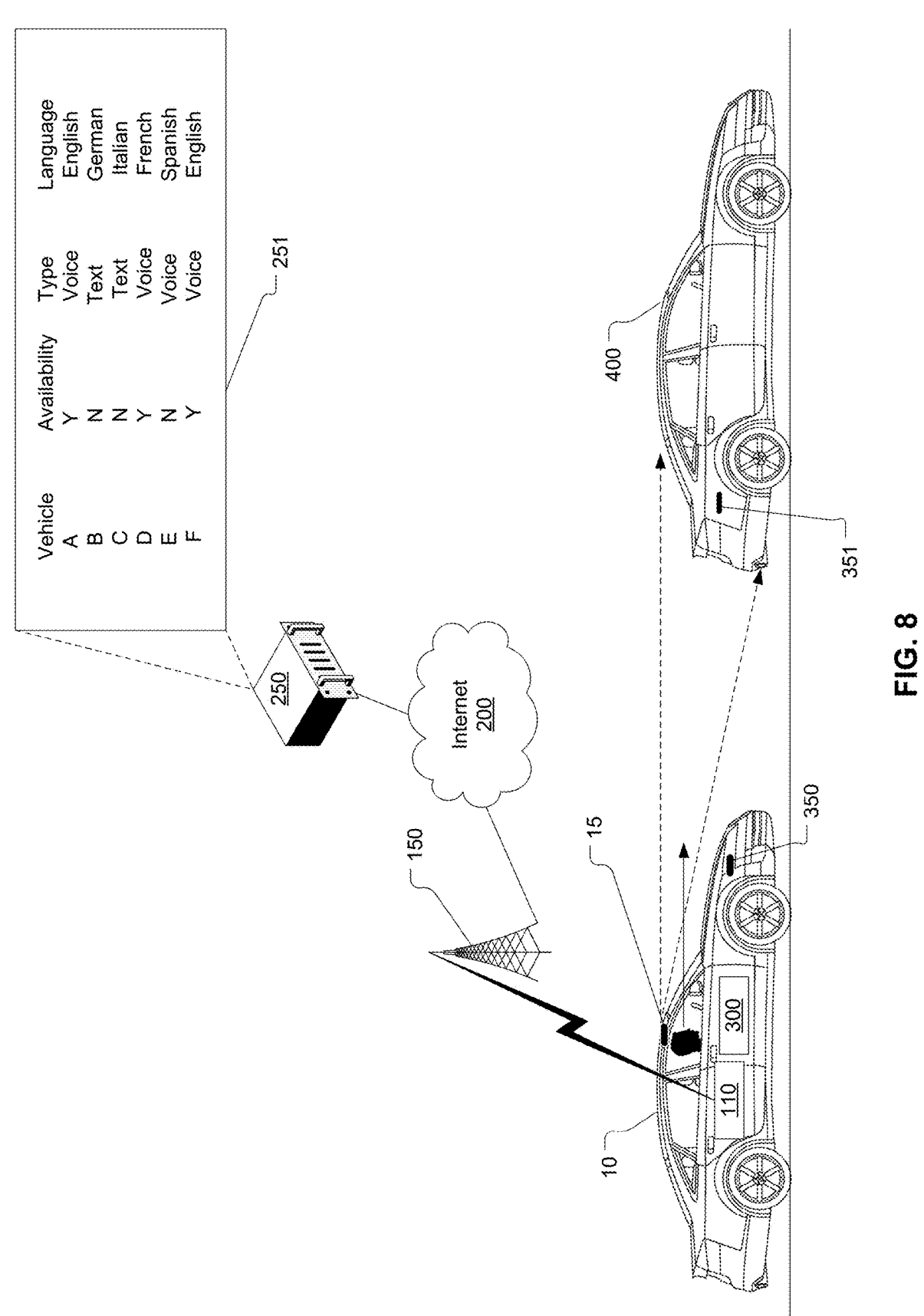
FIG. 8 depicts the remote server storing availability, communication type and language information for the occupants of the nearby vehicles.

In the embodiment depicted by way of example in FIG. 8, the database 251 stores a type of communication that the occupant(s) of the nearby vehicle will accept, e.g. voice or text. Thus, in one example embodiment, the nearby vehicle may not accept a voice communication but will permit a text message. In the embodiment of FIG. 8, the database 251 also includes a language specified by the occupant or vehicle owner. For example, the occupants of the nearby vehicles may speak various languages. The vehicle 10 can download from the remote server 250 the language that is spoken to enable the voice communication to be made in the language understood by the occupant(s) of the nearby vehicle. In one embodiment, the vehicle 10 includes a translation module which may be executed by the processor 300 to translate the voice communication from a first language spoken by the first occupant or second occupant to a second language identified by the remote server 250. The reply message from the remote server 250 to the vehicle 10 may indicate availability and specify a language of communication. For example with reference to FIG. 8, nearby vehicle D is available for voice communication but only in French. To communicate with vehicle D, for example, the occupant(s) of the vehicle may speak in the first language, e.g. English. The translation module of the vehicle 10 translates in real-time the English words of the occupant(s) in the first language into a second language, e.g. French, so that the French translated message can be played to the recipient(s) in the nearby vehicle D.

Figure 9:
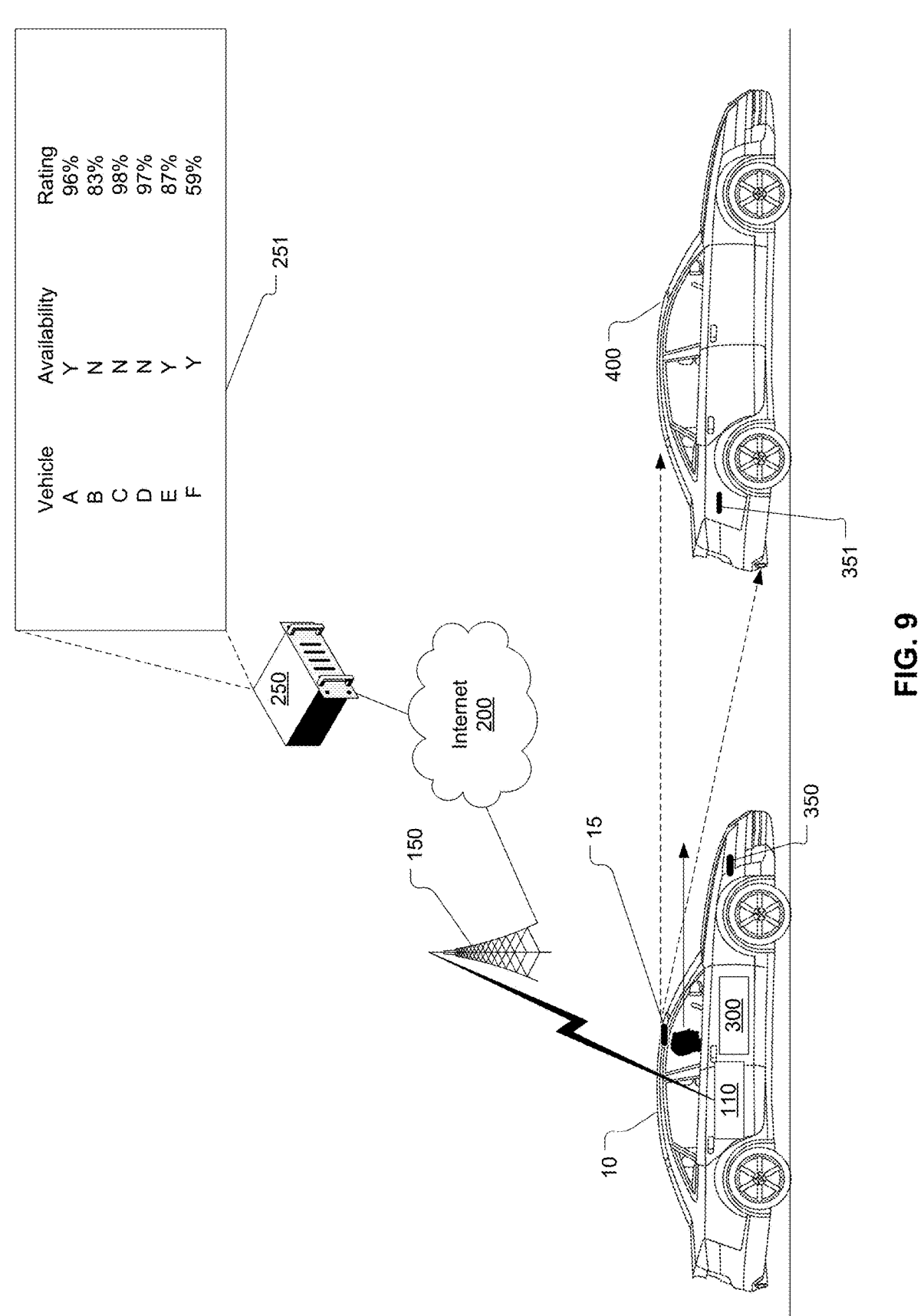
FIG. 9 depicts the remote server storing availability and ratings for the occupants of the nearby vehicles.

In the embodiment depicted by way of example in FIG. 9, the database 251 stores a rating for the vehicles and/or their occupants. The rating may be based on prior interactions and feedback or reviews collected by, or otherwise obtained by, the remote server 250. For example, an occupant who is habitually polite and has a history of harmonious interactions with others will enjoy a rating (score) that is higher than an occupant who is often rude or aggressive in his or her interactions. The rating may be used to determine whether to accept or deny a communication request from an unknown caller (stranger). For example, if an occupant of a nearby vehicle receives a communication request from a stranger, he may view the rating of the stranger prior to accepting the communication request. In one embodiment, the remote server 250 may also store minimally acceptable ratings to receive a call from a stranger. For example, a user (occupant of one vehicle) may specify that only a call from a stranger (occupant of another vehicle) having a rating of 95% or higher will be accepted. In a variant, different rating thresholds may be stipulated for different times of days, days of the week and locations. For example, in a certain neighbourhood and/or time of day, only a rating of 99% or higher would be acceptable whereas within a close distance of home in daylight perhaps a much lower rating of 85% would be acceptable to the same user.

Figure 10:
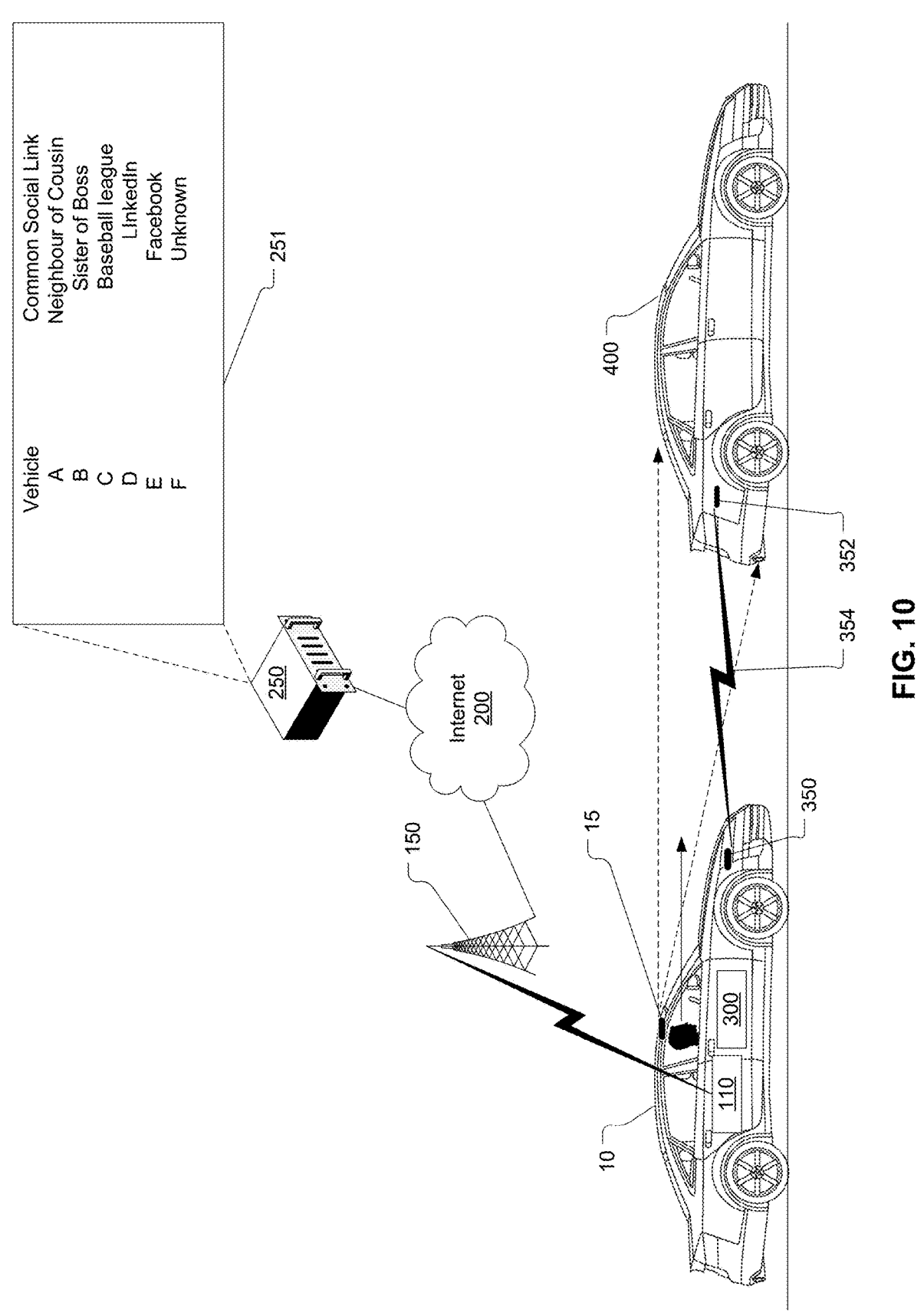
FIG. 10 depicts the remote server storing a common social link for the occupants of the nearby vehicles.

In the embodiment depicted by way of example in FIG. 10, the database 251 stores a common social link between the person seeking to communicate and the potential recipient of the communication. For example, the remote server 250 may generate and update an extended social network for each registered user to show how each particular user is connected to every other user within a particular geographical area. This extended social network determines in one embodiment how many degrees of separation between a person seeking to communicate and the potential recipient of the communication. More specifically, the extended social network may present to the potential recipient how, if at all known, the person seeking to communicate and the potential recipient of the communication are socially related. For example, the remote server 250 establishes that the occupant of nearby vehicle A is a neighbour of a cousin of the potential recipient. As another example, the occupant of nearby vehicle B is the sister of the recipient's boss. The occupant of nearby vehicle C is in the same baseball league. The occupant of vehicle D is connected via LinkedIn. The occupant of vehicle E is a friend on Facebook. The occupant of vehicle F is unknown, i.e. there is no known social connection between the two individuals. Optionally, at the behest of the party requesting the communication, the social connection is displayed as part of the communication request to the potential recipient. For example, the user interface (UI) of the nearby vehicle may present a notification an incoming call request has been received and providing the party's name and social connection. For example, the UI may display and/or audibly present the following message: You have an incoming call request from Mr. John Smith in a blue Audi A4. John Smith resides in Fort Lauderdale and is your brother's work colleague. This notification presumes that the requesting party has consented to provide his name, city of residence and social connection (common social link).

Figure 11:
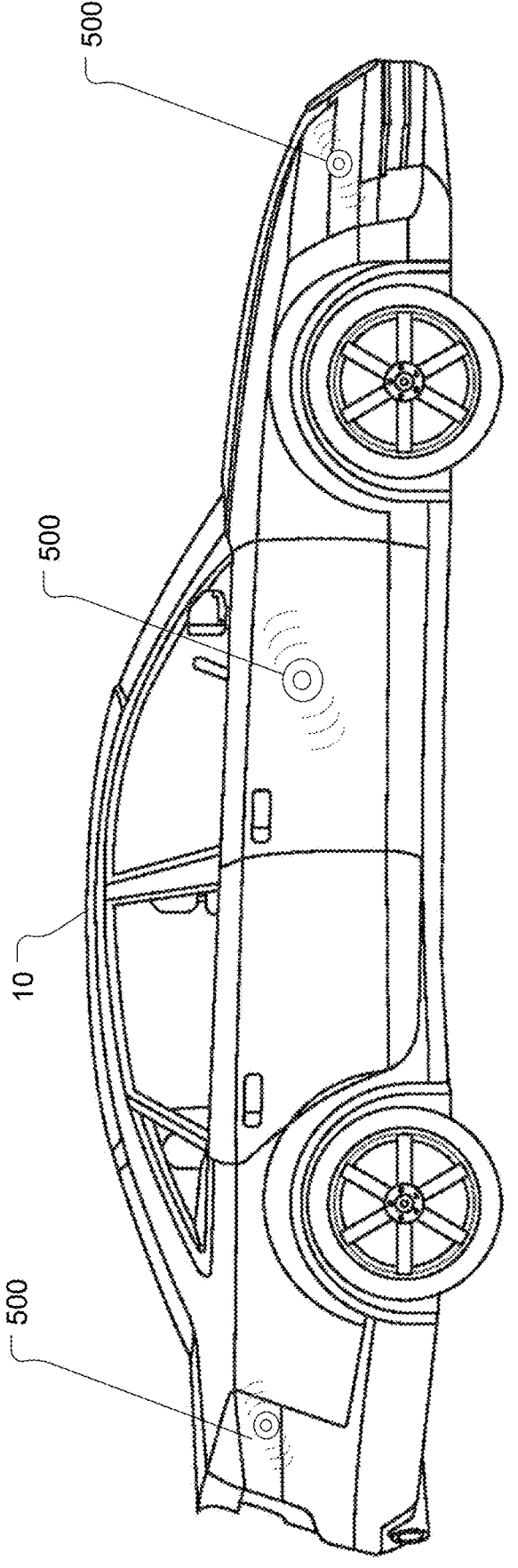
FIG. 11 depicts a vehicle having visual indicators to visually signal that the vehicle is seeking to initiate a call with a nearby vehicle or that the vehicle is ready to accept an incoming call.

In one embodiment, as shown by way of example in FIG. 11, the vehicle 10 includes a visual indicator 500 disposed on an externally visible portion of the vehicle to indicate visually to the nearby vehicle that the vehicle seeks to communicate. This visual indicator 500 may be, for example, a blinking light that blinks green, blue or purple, i.e. a color different from white, yellow, orange and red that are traditionally used as vehicle headlights, brake lights, turn signals, etc. The headlights, turn signal lights, brake lights may be adapted to display other light colors. Alternatively, a dedicated light or plurality of lights may be provided on the body of the vehicle. In another implementation, the visual indicator 500 may be used to signal a willingness to receive voice communications. For example, a vehicle may activate a light, e.g. a green light, to signal that voice communications are welcome at that time and a different color of light (e.g. blue) to signal that voice communications are unwelcome at that time. The lights may blink in a recognizable pattern to signal availability, e.g. blinking green-blue-green-blue, or green-blue-purple-green-blue-purple, etc. Although the figure shows the visual indicator on a body of the vehicle, in other embodiments, the visual indicator may be a light underneath the vehicle (undervehicle lighting) or a light inside the cabin of the vehicle that is visible from the outside or both. For example, the cabin can be lit in blue lighting or green lighting to signal that the occupants are willing to accept a call. Lighting may also be used to signify that an occupant has accepted a call or is already on a call. In one implementation, the vehicle may change a shading or translucency of one or more windows in response to accepting, rejecting, rejecting or terminating a call. The window may be shaded darker or lighter. Cabin lighting may be concurrently dimmed or brightened in conjunction with any change in window shading. Changes in window shade may be accomplished using a digital or virtual sunshade, window tint, etc. using an OLED or other such window. A physical sunshade driven by an electric motor and a suitable mechanism may alternatively be deployed or retracted.

After looking up the communication availability of the nearby vehicle, in one embodiment, the vehicle 10 includes a user interface to notify the first occupant and/or the second occupant of the communication availability and to receive a command from one or both of the first and second occupants to initiate the voice communication. The user interface may be a touch screen display, dashboard, or any other user interface element capable of displaying or audibly outputting a notification that the nearby vehicle is available for communication. The command may be a touch input, a voice command, or any other form of user input. In a first implementation, the vehicle detects that the occupants are both looking at the same nearby vehicle and automatically queries the remote server for availability without user input. If the nearby vehicle is available for communication, the user interface notifies the occupant(s) of the communication availability of the nearby vehicle. The occupants can then initiate a communication using a user interface element. In a second implementation, the vehicle only queries the remote server for availability if the occupant(s) are both looking at the same nearby vehicle and one of the occupants provides user input indicating that he or she wishes to initiate voice communication with the nearby vehicle. At that time, in this second implementation, the vehicle looks up the availability by querying the remote server.

Figure 12:
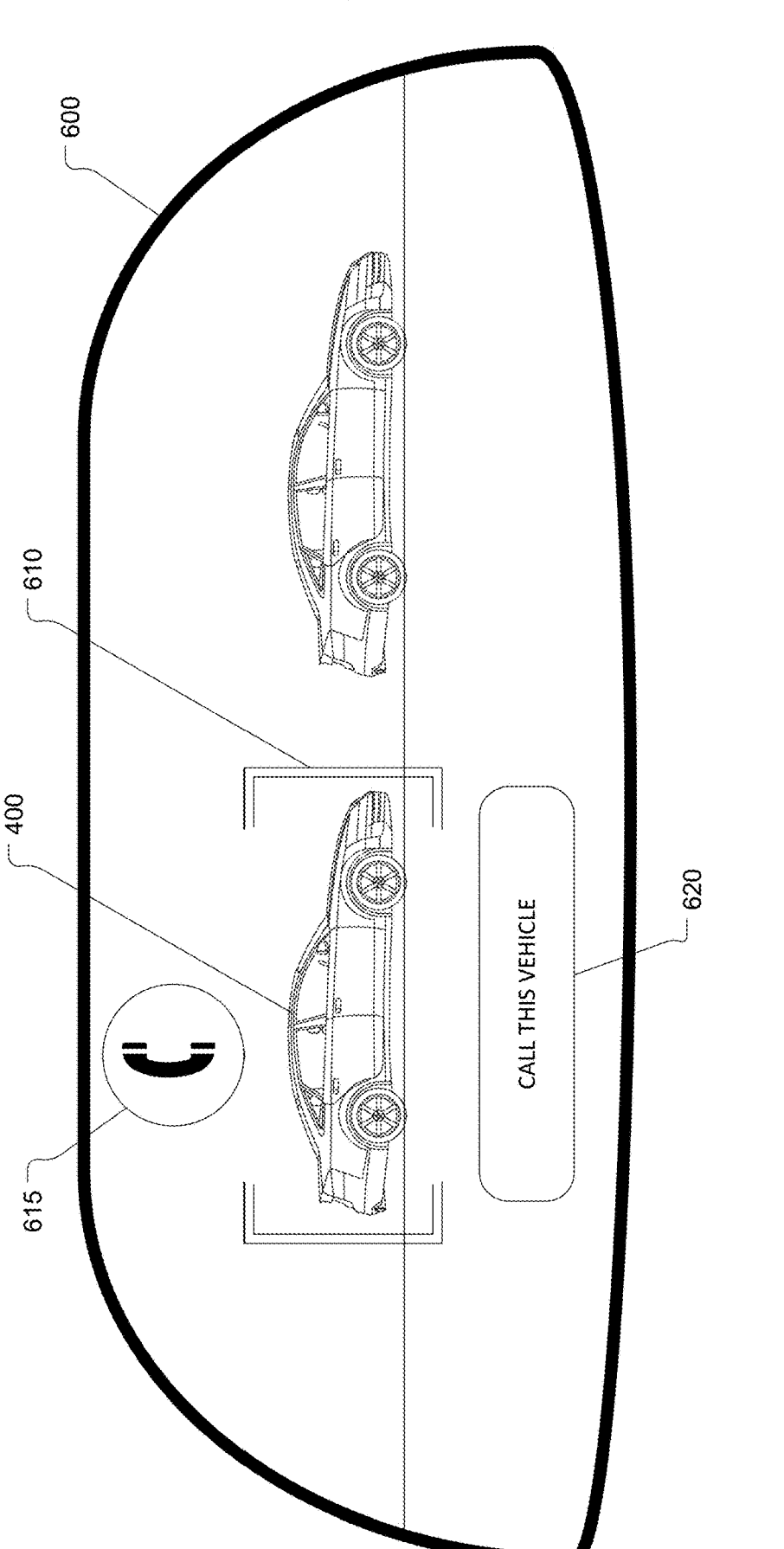
FIG. 12 depicts an information-displaying windshield of a vehicle displaying an augmented-reality overlay on the information-displaying windshield to highlight a nearby vehicle.

In one embodiment, as depicted by way of example in FIG. 12, the vehicle 10 includes an information-displaying windshield 600, e.g. a transparent OLED screen, for displaying an augmented-reality overlay 610 on the information-displaying windshield 600 to highlight the nearby vehicle 400. The augmented reality overlay 610 is shown as a frame or double-brackets but it may be any other graphical indicator, symbol, arrow, label, etc. that highlights, colors, shades or otherwise indicates or emphasizes the nearby vehicle that both occupants are looking at. In one specific embodiment, the information-displaying windshield 600 displays the communication availability using or the communication unavailability of the nearby vehicle 400 obtained from the remote server 250. The communication availability is displayed using a communication-availability icon 615 in FIG. 12. The information-displaying windshield 600 may also display a user interface element 620 to initiate the call ("Call this Vehicle"). Alternatively, a voice command may be used to initiate the call. Still alternatively, a user input device on the dashboard, steering wheel or other vehicle console may be used to initiate the call. This user input device may be a phone button on the steering wheel or dashboard that is ordinarily used to initiate a cellular call using a Bluetooth®-connected mobile communication device.

Figure 13:
FIG. 13 depicts an information-displaying windshield notifying the occupant of the vehicle that the occupant of the nearby vehicle is already on another call.

In the example presented in FIG. 13, the nearby vehicle 400 is unable to receive the voice communication (phone call) because the occupant of the nearby vehicle 400 is already busy on another phone call. In this case, the information-displaying windshield 600 (or other user interface of the vehicle 10) may present a notification to this effect. An example busy notification 630 is shown by way of example in FIG. 13.

Figure 14:
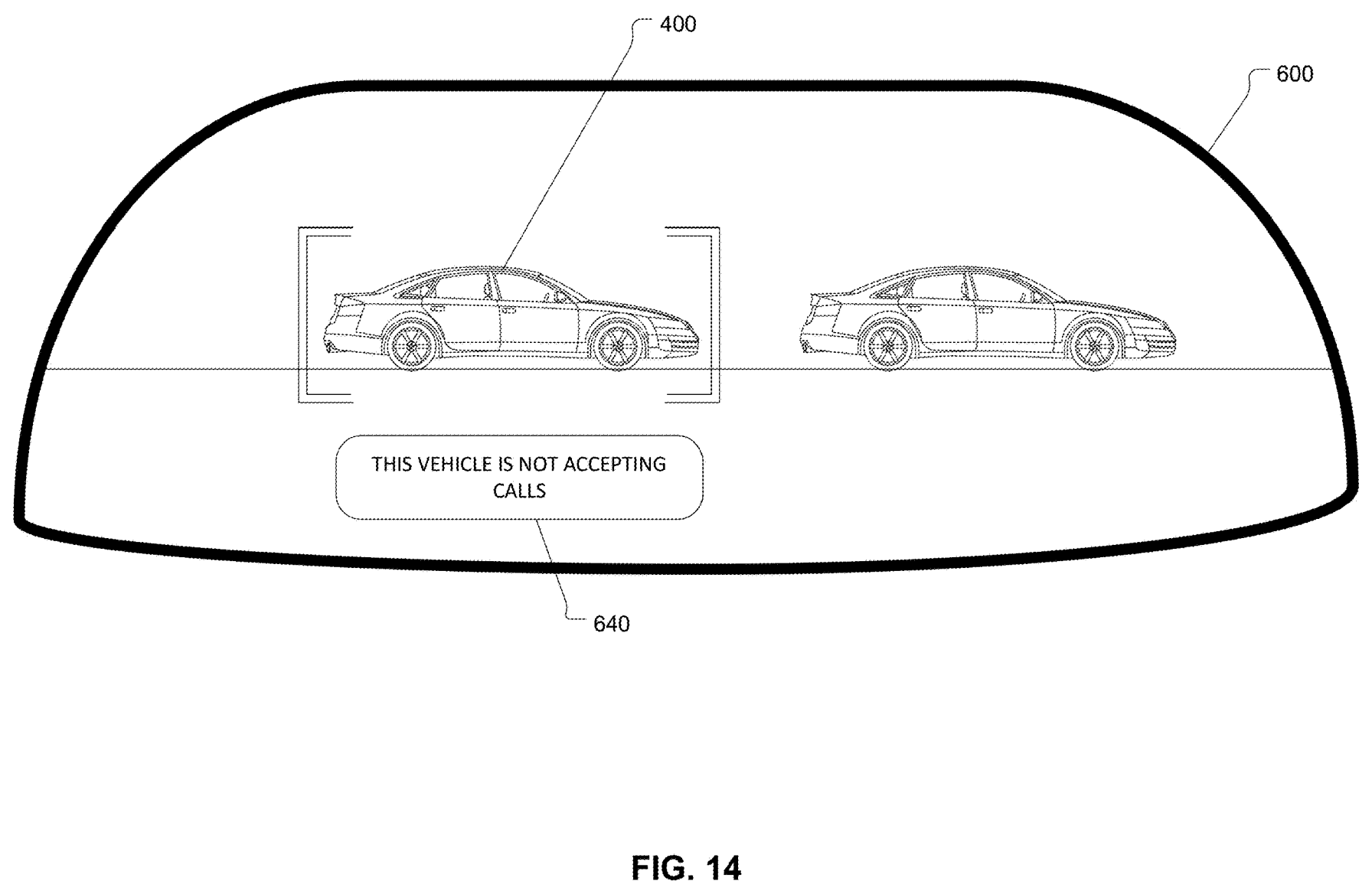

In another example presented in FIG. 14, the occupant of the nearby vehicle 400 is unable or unwilling to receive the voice communication. In this case, the information-displaying windshield 600 (or other user interface of the vehicle 10) may present a do-not-disturb notification 640 such as the one shown in FIG. 14 that the occupant of the nearby vehicle is not accepting calls. In a variant, there may be an option to send a text message.

Figure 15:
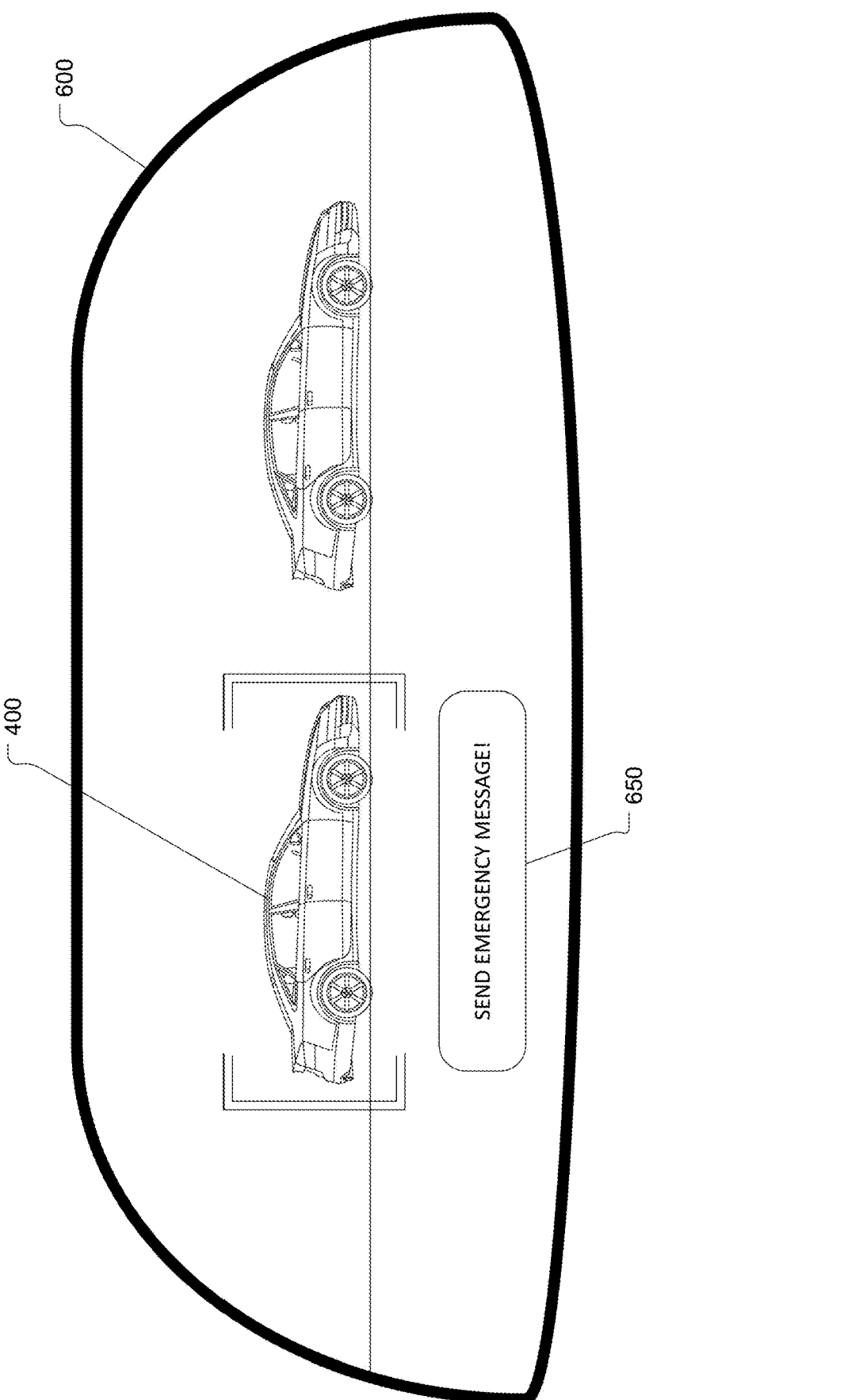
FIG. 15 depicts an information-displaying windshield presenting a user interface element to send an emergency message.

In the scenarios of FIG. 13 and FIG. 14, it may be desirable to send an emergency message to the nearby vehicle 400 as described above. In this case, as depicted by way of example in FIG. 15, the information-displaying windshield 600 (or other user interface of the vehicle 10) may present a user interface element 650 to send an emergency message to the nearby vehicle 400. Depending on the privacy settings (notification settings) of the occupant of the nearby vehicle 400, this emergency message may be delivered. Alternatively, the emergency message may cause a voice communication to be established. For example, the nearby vehicle 400 may display the emergency message and asking for a voice communication. As noted above, the emergency message may trigger a concurrent 911 call using another cellular device or cellular channel or as a conference call. The nearby vehicle 400 may receive and present a notification that the vehicle 10 seeking to communicate has called 911.

Figure 16:
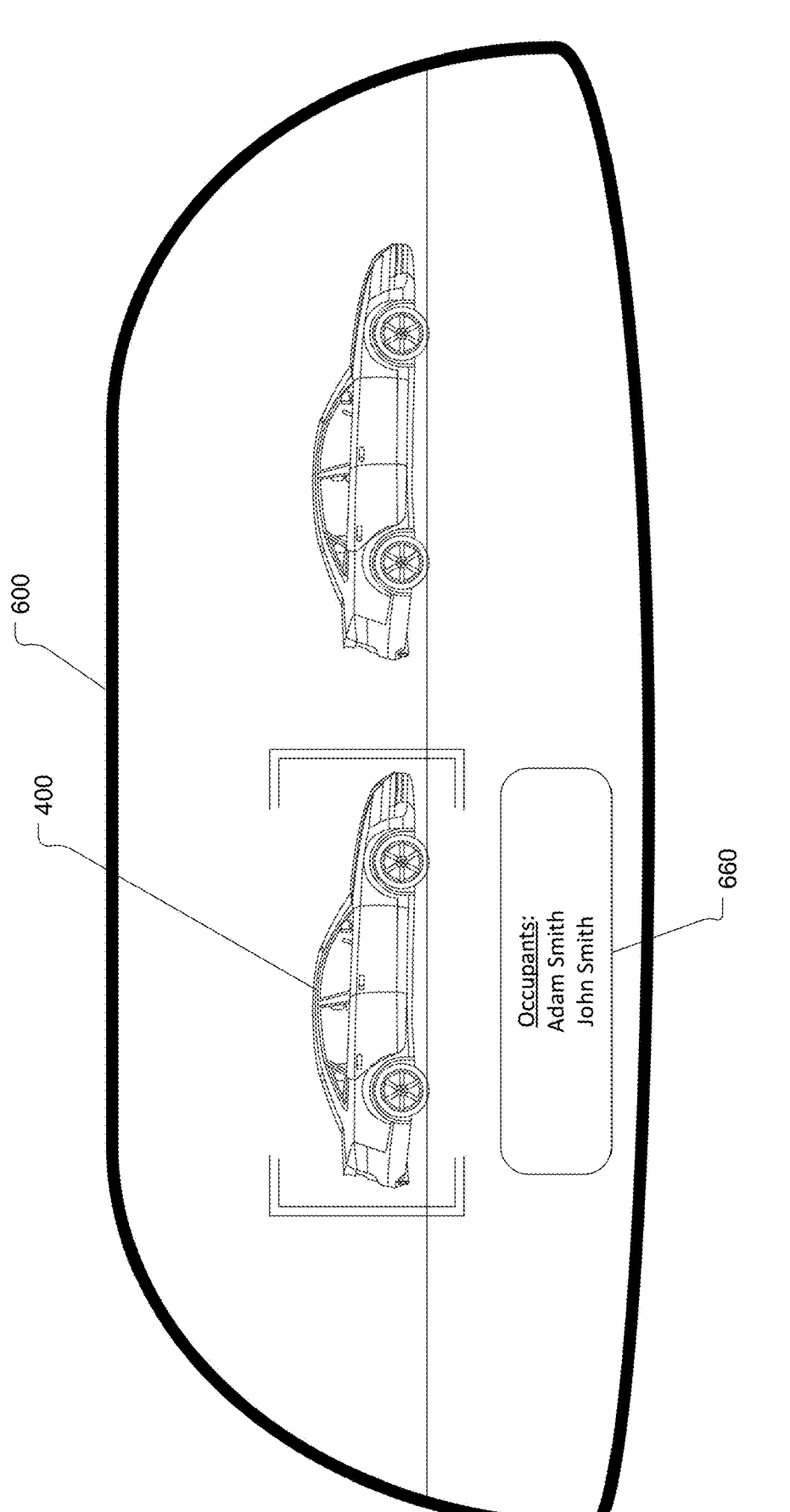
FIG. 16 depicts an information-displaying windshield displaying names of the occupants of the nearby vehicle.

In one specific embodiment, the information-displaying windshield 600 displays a name of each occupant of the nearby vehicle 400 as shown by way of example in FIG. 16. In one specific embodiment, the information-displaying windshield 600 displays information about the nearby vehicle 400. The information may be one or more of a vehicle type, a name of a vehicle owner, insurance information, and vehicle registration information presuming that these individuals in the nearby vehicle had consented to disclose their names and this other information to the occupants of the vehicle 10 seeking to communicate. In one specific embodiment, the information-displaying windshield 600 displays information about the nearby vehicle 400, the information comprising one or more of a vehicle type (e.g. make, model, year, color), a name of a vehicle owner, insurance information, a VIN number, and vehicle registration information. Alternatively or additionally, the information may specify if the vehicle is electric, gas-powered or hybrid, hydrogen-powered, etc., whether is being driven autonomously, semi-autonomously or by a human driver. Alternatively or additionally, the information may specify if the vehicle is a police car, ambulance, fire truck, tow-truck, garbage truck, recycling truck, or military vehicle. Alternatively or additionally, the information may specify if the vehicle is a taxi, ride-hailing vehicle (e.g. Uber, Lyft, etc.), a delivery vehicle, etc.

Figure 17:
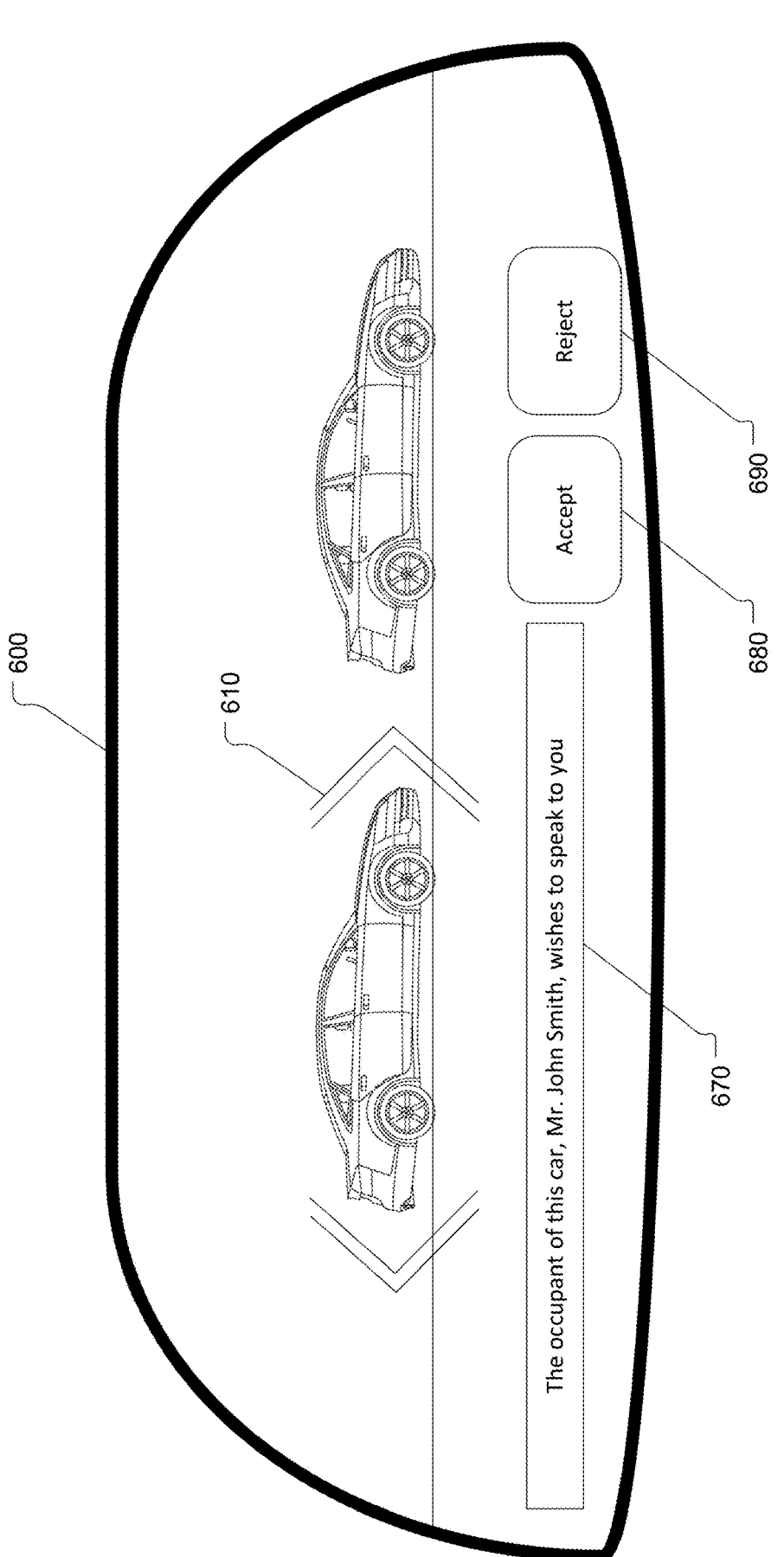
FIG. 17 depicts an information-displaying windshield notifying the occupant of the vehicle of an incoming call and presenting user interface elements to accept or reject the incoming call.
Figure 18:
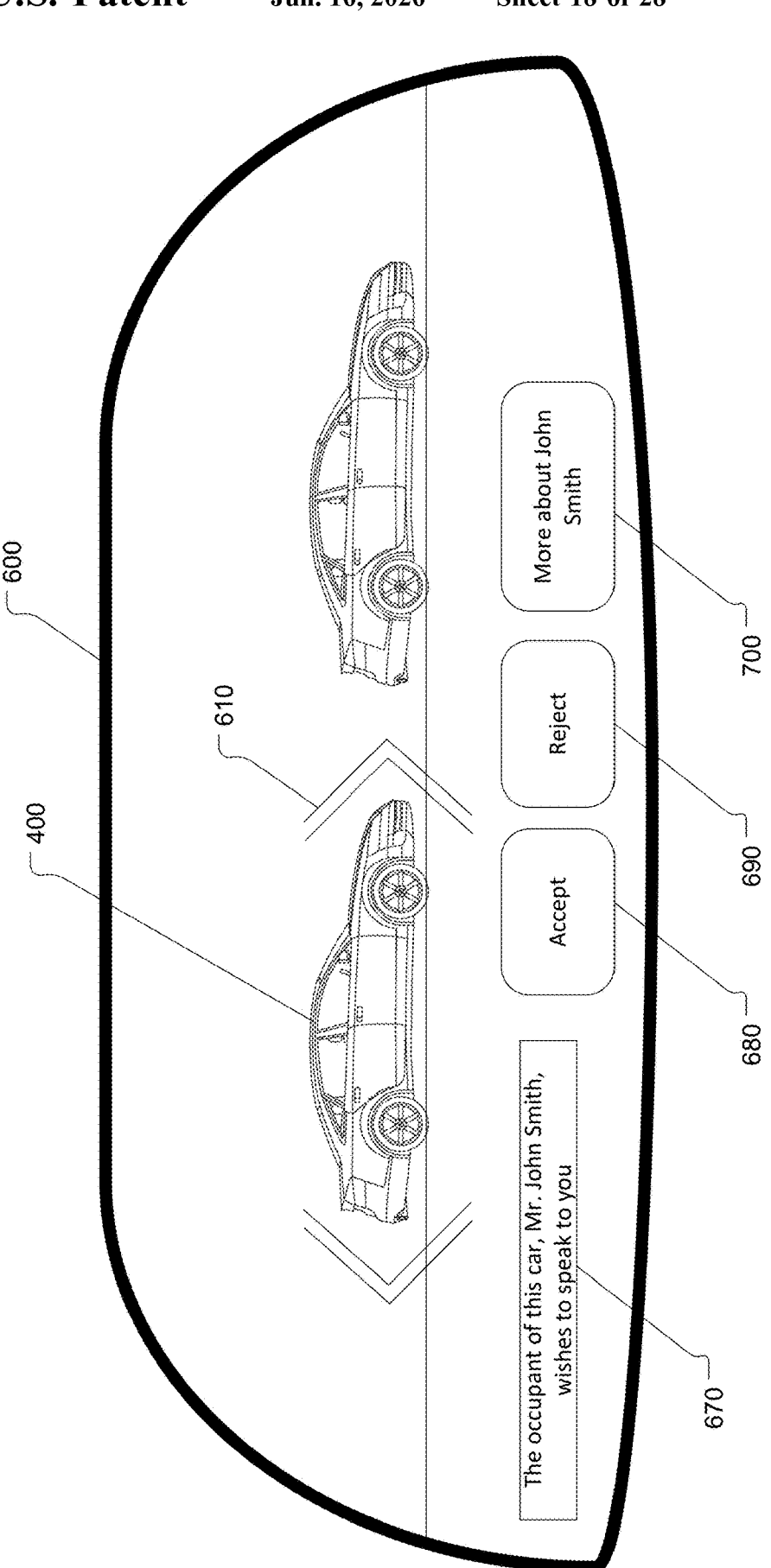
FIG. 18 depicts the information-displaying windshield presenting a user interface element to obtain more information about the caller.
Figure 19:
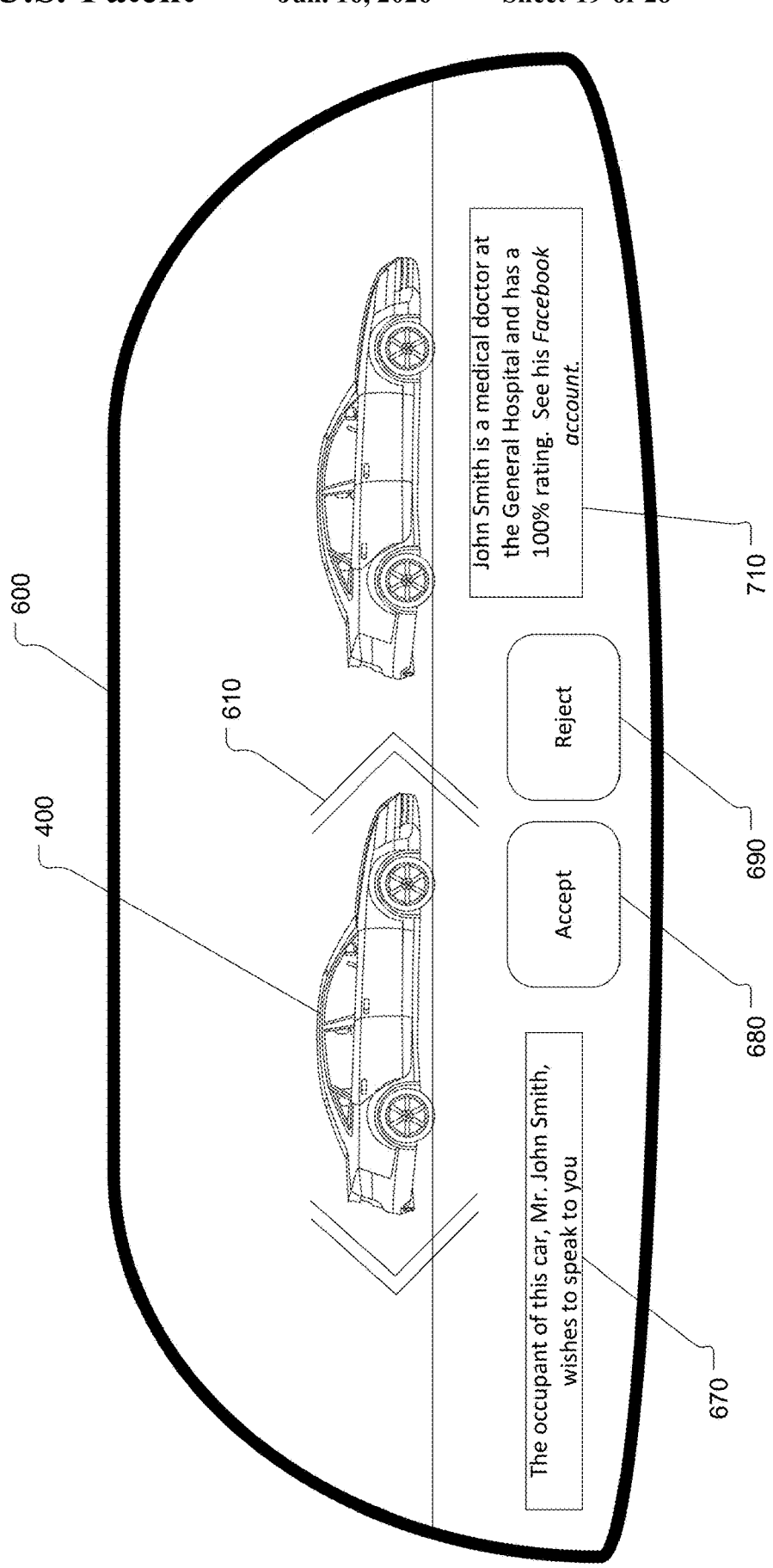
FIG. 19 depicts the information-displaying windshield presenting more information about the caller.

In the embodiment depicted by way of example in FIG. 17, the information-displaying windshield (or other user interface) displays or presents information about the occupant seeking to initiate the communication. Thus, to clarify, FIG. 17 may be the information-displaying windshield of the recipient vehicle (i.e. the nearby vehicle 400). It is however to be understood that any vehicle can be considered either the calling vehicle or the recipient vehicle depending on which vehicle initiates the call. In FIG. 17, the information-displaying windshield 600 graphically highlights using an augmented reality overlay 610 the calling vehicle using a frame or double angled brackets (which are merely depicted as an example). Any other suitable graphical indicator or augmented reality display technique may be used to highlight the calling vehicle. It will be appreciated that the calling vehicle may not be visible in the windshield, e.g. if the calling vehicle is behind or beside the recipient vehicle. The incoming communication request or call notification 670 can be displayed and/or presented audibly to the occupant(s) of the recipient vehicle. The name of the calling party (occupant of the vehicle seeking to initiate the call) may be displayed or spoken audibly. The incoming call can be accepted using a call-accept UI element 680 or rejected using a call-reject UI element 690. In another embodiment, the information-displaying windshield 600 or other user interface of the vehicle can present another more-information UI element 700 to enable the occupant(s) in the recipient vehicle to obtain more information about the calling party (caller). In response to providing user input on the more-information UI element 700, the information-displaying windshield 600 or other user interface of the vehicle presents more caller information 710 about the calling party. This caller information box may include the address, occupation, work place, etc. of the caller. This caller information may also include hyperlinks to social media profiles like Facebook, Instagram, LinkedIn, etc.

Figure 20:
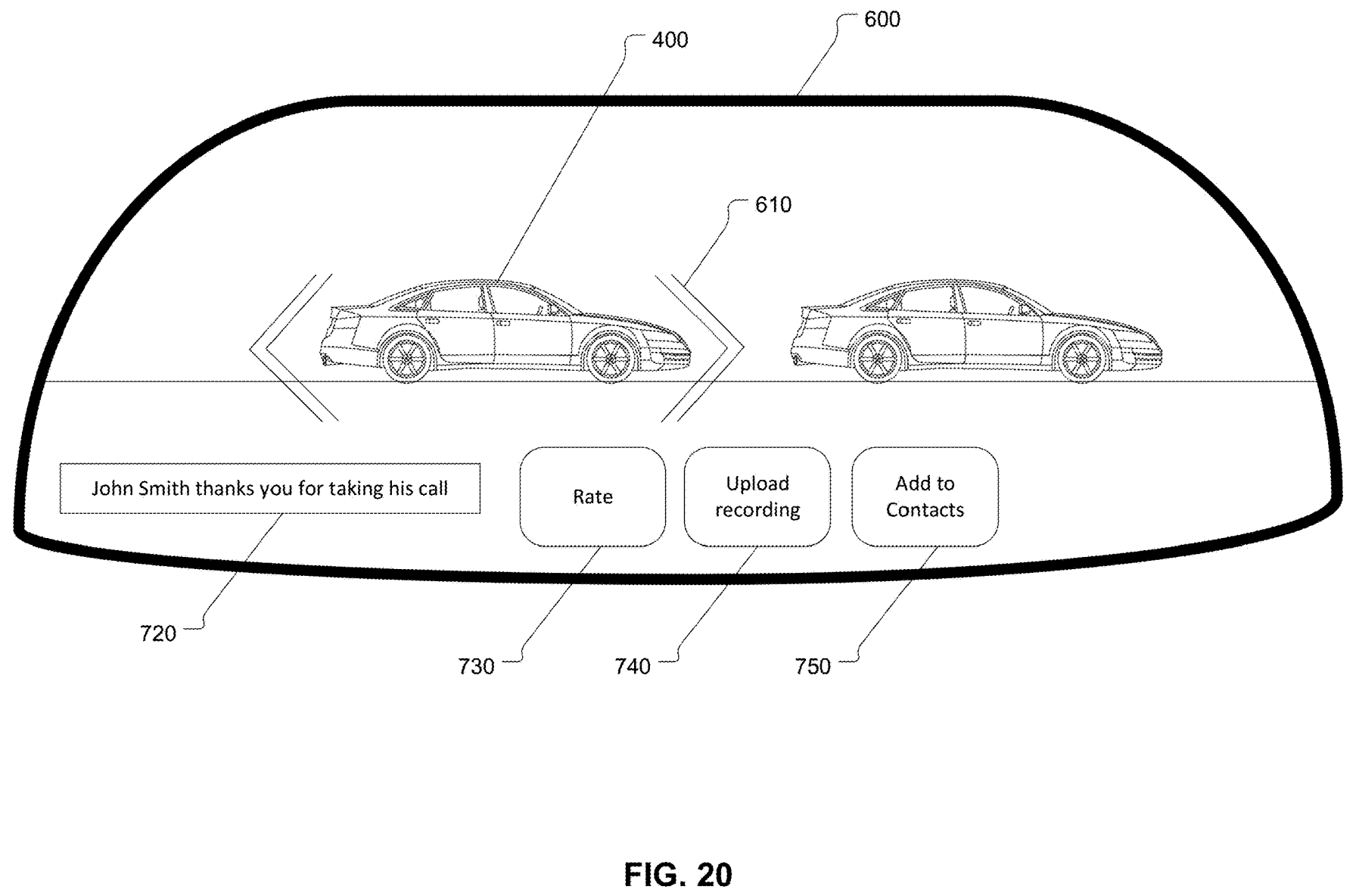

In the embodiment of FIG. 20, the information-displaying windshield 600 or other user interface of the vehicle optionally presents a predetermined message from the caller thanking the recipient for taking his call. The information-displaying windshield 600 or other user interface of the vehicle optionally presents a rate-caller UI element 730 to enable the recipient to rate the experience with the caller (e.g. to provide a star-based rating, review, endorsement, etc). In the event of a bad experience, the recipient can use the upload recording function 740 to upload a recording of the call to the remote server. The remote server may execute a conversation analysis module to analyze the conversation for content (e.g. friendly language vs. swearing, threats, accusations, etc) and tone (gentle and friendly tone vs. an aggressive or angry tone) to rate the caller and to validate any rating given by the recipient. The recipient may use an add-contact UI element 750 to add the caller as a new contact, assuming the call was amicable.

In another implementation of this invention, the vehicle 10 has only a single eye tracker 302 for tracking a gaze 304 of a single occupant 306 of the vehicle 10 and to generate gaze direction data 308 representative of the gaze 304 of the occupant 306. The vehicle 10 has a processor 300 communicatively connected to the eye tracker 302 to receive the gaze direction data. The processor 300 is configured to use the gaze direction data 304 to determine if the occupant 306 is gazing at a nearby vehicle 400 that is sensed by a vehicle-detecting sensor such as a camera 15, LIDAR 17 or RADAR 16. The eye tracker 302 may implanted gaze endpoint determination technology to determine a focus of the occupant. As is the case with the two-occupant embodiment described above, the processor 300 in the case of the single-occupant embodiment is also configured to determine an identification of the nearby vehicle 400. This may also be done by optically recognizing characters of a license plate of the nearby vehicle using the camera 15. This may alternatively or additionally be accomplished by detecting an identification beacon broadcast by the nearby vehicle 400 using a short-range vehicle-to-vehicle transceiver. A radiofrequency cellular transceiver 110 of the vehicle cooperates with the processor 300 to transmit a communication-availability query message to a remote server 250 to look up the identification of the nearby vehicle 400 and to receive a communication-availability reply message from the remote server 250 indicating either a communication availability or communication unavailability of the nearby vehicle 400. The processor 300 cooperates with the radiofrequency cellular transceiver 110 or the short-range vehicle-to-vehicle transceiver 350 to initiate a voice communication with the nearby vehicle 400 in response to the communication-availability reply message indicating the communication availability of the nearby vehicle 400. In one embodiment, the vehicle 10 includes a user interface to notify the occupant of the communication availability and to receive a command from the occupant to initiate the voice communication.

In one embodiment, the vehicle 10 includes an information-displaying windshield 600 for displaying an augmented reality overlay 610 on the windshield to highlight the nearby vehicle 400. In one specific embodiment, the information-displaying windshield 600 displays the communication availability or the communication unavailability of the nearby vehicle obtained from the remote server.

In one embodiment, the communication-availability query message is an emergency message. In this embodiment, the remote server 250 stores in database 251 a general privacy setting for determining the communication availability of the nearby vehicle and an emergency messaging setting for the nearby vehicle that is distinct from the general privacy setting. For example, the occupant of vehicle B is unwilling to receive a general message but is willing to receive an emergency message.

It will be appreciated that all of the features of the embodiments described above involving two eye trackers can be applied or adapted to an implementation having only a single eye tracker.

In another embodiment, the vehicle 10 includes a first head tracker for inferring a first gaze of a first occupant of the vehicle and to generate first gaze direction data and a second head tracker for inferring a second gaze of a first second of the vehicle and to generate second gaze direction data. In this embodiment, the first and second head trackers replace the first and second eye trackers. However, in a further embodiment, the vehicle has both eye and head trackers, i.e. first and second eye trackers and also first and second head trackers. The first head tracker detects the orientation of the head of the first occupant. Similarly, the second head tracker detects the orientation of the head of the second occupant. Since the eye direction (direction of gaze) is not precisely determined by the head orientation, the present embodiment draws an inference about the gaze direction for example using a probabilistic model of eye direction as a function of head orientation. Despite the less precise inference of gaze direction, the vehicle in this embodiment can still identify which nearby vehicle the two occupants are both likely gazing at. In sparse traffic, this embodiment can be as accurate as the eye tracker; however, the eye tracker is considered by the applicant to be the best mode of implementing this invention. In this embodiment using the head tracker, the vehicle 10 also includes a processor 300 communicatively connected to the first head tracker and to the second head tracker to receive the first gaze direction data and the second gaze direction data, wherein the processor is configured to compare the first gaze direction data and the second gaze direction data to determine if the first occupant and the second occupant are both gazing at a nearby vehicle sensed by a vehicle-detecting sensor, wherein the sensor is a camera, LIDAR or RADAR. The processor is configured to determine an identification of the nearby vehicle 400 by optically recognizing characters of a license plate of the nearby vehicle 400 using the camera 15, or by detecting an identification beacon broadcast by the nearby vehicle using a short-range vehicle-to-vehicle transceiver. The vehicle has a radiofrequency cellular transceiver 110 cooperating with the processor 300 to transmit a communication-availability query message to a remote server 250 to look up the identification of the nearby vehicle 400 and to receive a communication-availability reply message from the remote server 250 indicating either a communication availability or communication unavailability of the nearby vehicle 250. The processor 300 cooperates with the radiofrequency cellular transceiver 110 or the short-range vehicle-to-vehicle transceiver 350 to initiate a voice communication with the nearby vehicle 400 in response to the communication-availability reply message indicating the communication availability of the nearby vehicle 400. In another embodiment, there is only a single head tracker for tracking the head orientation of only a single occupant of the vehicle. It will be appreciated that all of the features of the embodiments described above involving two eye trackers or one eye tracker can be applied or adapted to an implementation having a head tracker or two head trackers. It will also be appreciated that an embodiment could entail both eye trackers and head trackers for even more accurate gaze detection.

In one embodiment, the vehicle 10 includes an occupant-sleep sensor to sense if the first occupant or the second occupant is asleep. This occupant-sleep sensor may, for example, be a camera facing the occupants that detects when an occupant has fallen asleep by observing closed eyes for a period of time. Another type of biometric sensor may be used alternatively or additionally to detect that the occupant is asleep. The processor 300 is configured to ignore the first gaze direction data if the first occupant is asleep or to ignore the second gaze direction data if the second occupant is asleep.

The embodiments described above enable occupants of vehicles to communicate with each other in a more efficient manner. This new technology enables occupants to communicate with each other without resorting to ambiguous and potentially rude hand signs, waving and gesticulations, not to mention honking of horns and flashing of headlights. Some embodiments of this technology enable communications to be initiated without knowing the cell phone number of the occupant of the other vehicle. There are many use cases for this technology. For example, in many vehicle interactions in ordinary daily driving, it is desirable to be able to speak to the driver or occupant of another nearby vehicle. For example, at an intersection of stop signs, it might be useful to be able to verbally invite the other driver to go ahead without having to wave, gesticulate or flash headlights. As another example, when searching for a parking space, one might stop near an idling vehicle to ask the occupants if they are leaving the space soon. Occupants of one vehicle can use this technology to ask for directions from an occupant of another vehicle or to inform the occupant of another vehicle that there is a problem with his vehicle (e.g. a flat tire). An another example, a city bus driver may wish to say hello to a colleague driving by in another city bus. A garbage truck driver or tow-truck driver may wish to ask an occupant of a parked or idling car to move his vehicle. A group of friends, colleagues or team-mates traveling in multiple self-driving taxis or ride-hailing vehicles may communicate amongst themselves efficiently without needing to know the cell phone numbers of those in the other vehicles. For law enforcement, this technology enables police to communicate efficiently and safely with occupants of other nearby vehicles. For example, if police have a concern about a nearby vehicle, the police can initiate a voice communication with the occupants while both the police and the nearby vehicle are still moving. Or, in a roadside stop, the police can initiate communication from the safety of their patrol car. In a more mundane use case, a person driving home can simply say hello to a neighbor driving by and start a conversation without having to stop in the middle of the street, roll down their windows and block traffic. A stranded or broken down vehicle can also initiate communication with a nearby vehicle to ask for help. Likewise, a good Samaritan seeing a stranded vehicle may initiate communication to ask if the occupants need help. In a valet parking scenario, the valet can communicate with other vehicles arriving at the venue to coordinate where to stop and leave their cars while remaining inside one of the vehicles. In a traffic jam or at the scene of an accident, the police, fire truck, ambulance and/or tow trick can communicate with nearby vehicles to coordinate traffic flow around the accident. More generally, occupants of one vehicle who wish to communicate with occupants of another vehicle can do so, assuming the recipients agree, without needing to know the cell phone number(s) of the occupant(s) of the other vehicle. Furthermore, in some embodiments, occupants of vehicles can signal their availability to communicate, thereby opening up potential social opportunities to interact with occupants of other vehicles. For example, at a tailgate party, drive-in movie theater, drive-in restaurant (carhop) or other social gathering where occupants are seen at least part of the time in their vehicles, this technology has the potential to be used to create new social encounters between occupants of vehicles.

Although the description above refers to a voice communication or a telephone call, it is to be appreciated that the concept may be extended readily to video calls in certain cases. In a video-call implementation, if the vehicle is operating autonomously (in self-driving mode), then a video call can be safely established for the occupant of the autonomous vehicle. Likewise, if the recipient vehicle is operating autonomously, the occupant of the recipient vehicle may also participate in a video call safely. In the above description of initiating a call, it is understood therefore that the same concepts can be used to initiate a video call by the requesting vehicle and that the same concepts can be used to receive a video call by the recipient vehicle. Thus, in one embodiment, the vehicle receiving the incoming call determines if it is operating in autonomous mode or not and receives the call as a video call only if operating in autonomous mode. The call is converted into a voice call (audio only) if the vehicle is not operating in autonomous mode. In a further embodiment, the vehicle can be configured to automatically switch into autonomous mode upon receiving an incoming request for a video call.

In one implementation, the vehicle can have a horn linked to the processor 300 that determines whether to blare the horn normally (e.g. for a safety reason such as avoiding a collision) or whether to suppress the sound of the horn because there is no detected safety concern and to initiate a voice call instead of sounding the horn. For example, if the vehicle is stationary and there is only a single nearby vehicle, the horn may be suppressed because there is no detected risk of collision or other safety concern. Instead of sounding the horn, a voice communication initiated with the nearby vehicle. In one embodiment, the suppression of the horn is only done if the vehicle first determines that the nearby vehicle is available to receive the communication. This horn-suppression feature reduces unnecessary noise pollution. In a variant, the voice communication triggered by pressing the horn may contain a predetermined voice message, e.g. "Excuse me, I'm trying to get past your vehicle. Thank you for your cooperation!" A polite predetermined message spoken in a friendly tone is likely to be better received by the occupant of a nearby vehicle than a blast of a horn and/or a gesticulation. The predetermined messages are helpful to reduce the likelihood of an unfriendly interaction escalating into road rage. Similarly, the vehicle can have its headlights or high-beams linked to the processor 300 so that if the driver of the vehicle attempts to flash his lights, the processor suppresses the command to flash the lights and instead sends a predetermined message to the nearby vehicle such as "I'm sorry I'm a rush. Could you kindly let me pass?". The vehicle can store a plurality of predetermined messages for different traffic scenarios. The vehicle can recognize (e.g. using its camera or other sensors like its RADAR or LIDAR) a particular traffic scenario and then select the most appropriate predetermined message to send for that particular scenario. The sending of the predetermined message may be user-triggered, e.g. by the user hitting the horn, attempting to flash the high-beams or interacting with any other user input device). The sending of the message may also be automatic, i.e. the vehicle can automatically (i.e. without any user input) initiate communication with a nearby vehicle to send a predetermined message in response to recognizing a particular traffic scenario. For example, the vehicle may detect that the nearby vehicle has stopped ahead for no apparent or legitimate reason. The vehicle recognizes that this a traffic scenario for which it has a predetermined message, e.g. "Excuse me, we would like to get by". The vehicle automatically selects the predetermined message and automatically transmits this message to the nearby vehicle. The predetermined message may be a voice communication and/or a textual message.

In accordance with another implementation, the availability or unavailability of other vehicles to receive communications may be dynamically presented on an augmented reality windshield (i.e. any information-displaying windshield that uses augmented reality, virtual reality or mixed reality) to overlay images on the windshield for the occupants. The windshield may be touch-sensitive in some embodiments. In some cases, the vehicle may have a heads-up displays (HUD) having optics for projection of information onto the windshield.

Figure 21:
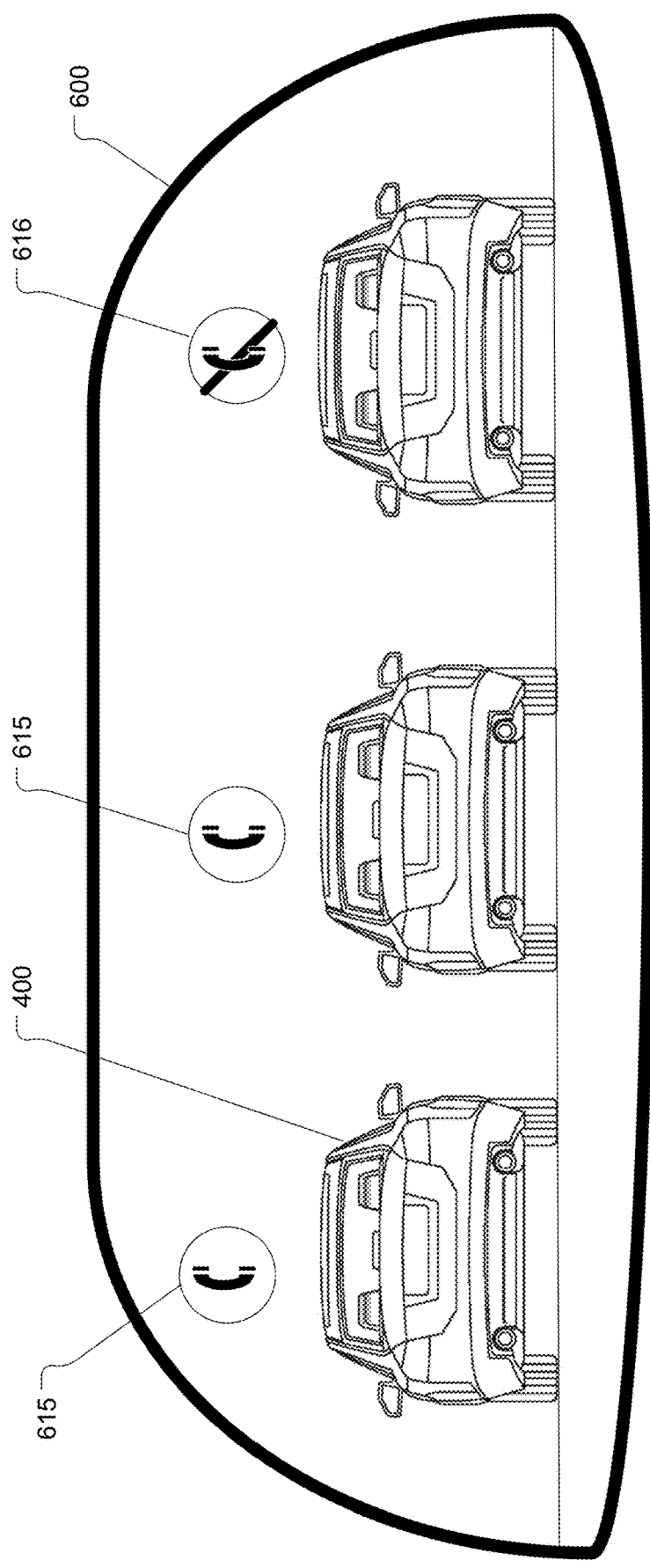
FIG. 21 depicts an augmented reality windshield showing multiple vehicles that are labeled with augmented reality symbols indicating their availability or unavailability to receive a call.

FIG. 21 depicts an augmented reality windshield 600 showing multiple vehicles 400 that are labeled with augmented reality symbols indicating their availability or unavailability to receive a call. In this example, the left and center two vehicles 400 are shown with call availability symbols 615 indicating their availability to receive a call whereas the right vehicle 400 is shown with a call unavailability symbol 616 indicating its unavailability to receive a call. In this implementation, the occupant's vehicle 10 automatically scans license plates or receives V2V ID beacons and then automatically sends a query message to the remote server 250 to look up the availability or unavailability of these other vehicles 400 without requiring the occupant(s) to gaze at the nearby vehicle. This is different from the embodiments described above in which the trigger to send the query message is the gaze of the occupants. In this implementation, the vehicle does not wait for the occupant(s) to gaze at a particular nearby vehicle. The vehicle instead attempts to identify all (or a subset) of the nearby vehicles and then looks up their availability by querying the remote server 250. The vehicle receives availability data and then presents the availability of all of the nearby vehicles 400, or at least a subset thereof, as shown in FIG. 21.

Figure 22:
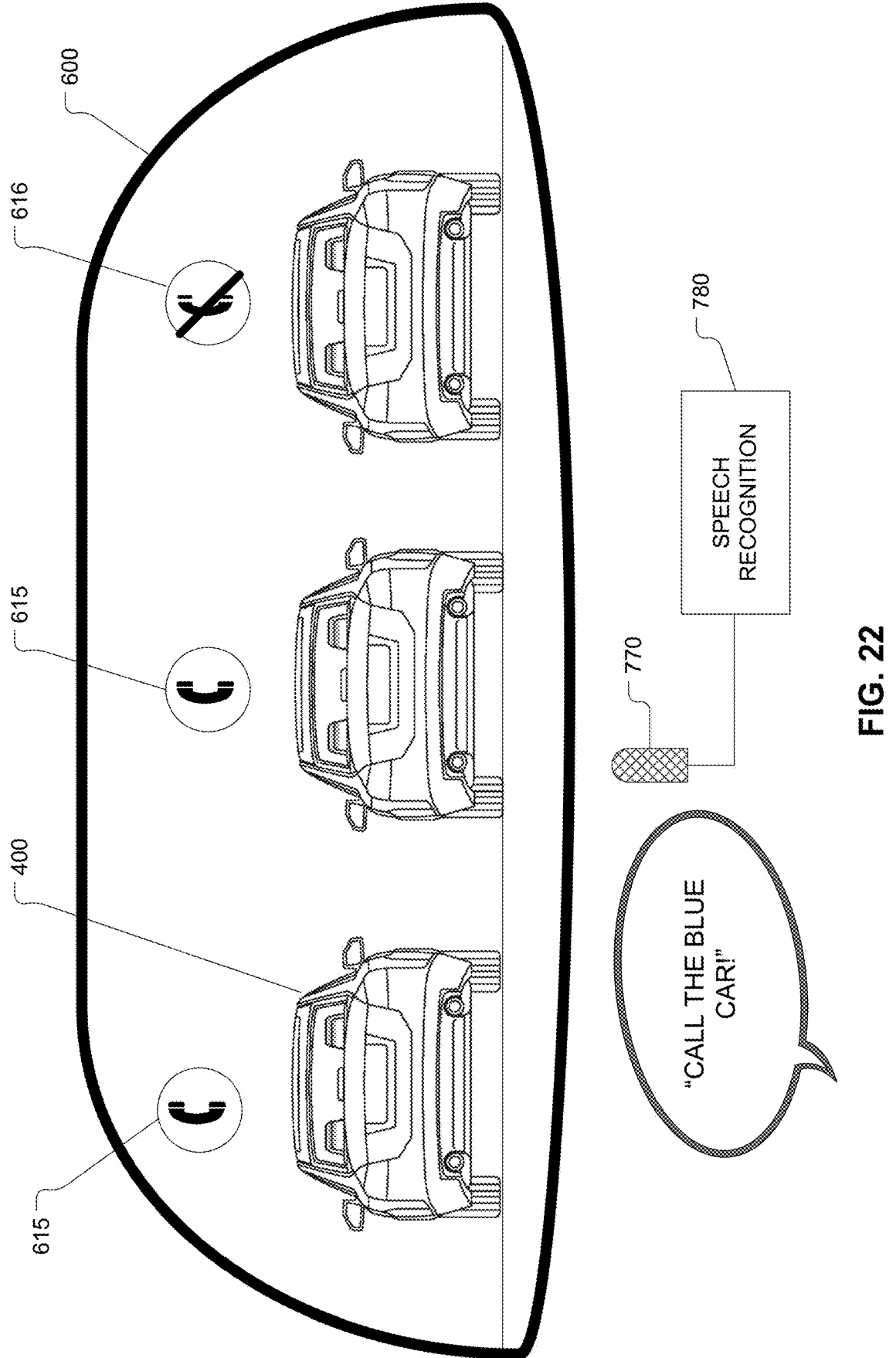
FIG. 22 depicts the augmented reality windshield of FIG. 21 in combination with a microphone and voice recognition module for recognizing a voice command of an occupant who is verbally instructing the vehicle to call one of the other vehicles that is available for receiving a call.

FIG. 22 depicts the augmented reality windshield 600 of FIG. 21 in combination with a microphone 770 and a voice recognition module 780 for recognizing a voice command of an occupant who is verbally instructing the vehicle to call one of the other vehicles 400 that is available for receiving a call. The occupant may issue a command to call the car on the left or the car in the middle. In this example, the occupant identifies the car by its color. For example, the occupant speaks the command "Call the blue car". The occupant may identify the nearby vehicle by one or more of its make, model, color, type (sedan, station wagon, SUV, pickup, van) etc., hereinafter a "visual identification" of the nearby vehicle. In this implementation, the vehicle 10 receives a reply message from the remote server containing availability data and visual identification data (e.g. type, model, make, color, etc.) for each vehicle that is available for communication. The vehicle can then use its camera(s) and an image-recognition module to recognize or identify the specific vehicles and thus to correlate the make, model and color with the availability and communication settings data received from the remote server. Communication settings data may include a cellular number, data to initiate a VoIP call or data to establish any other form of communication. This enables the vehicle to receive a voice command from an occupant and to then identify the vehicle that the occupant means so that a communication can be initiated with the intended vehicle.

Figure 23:
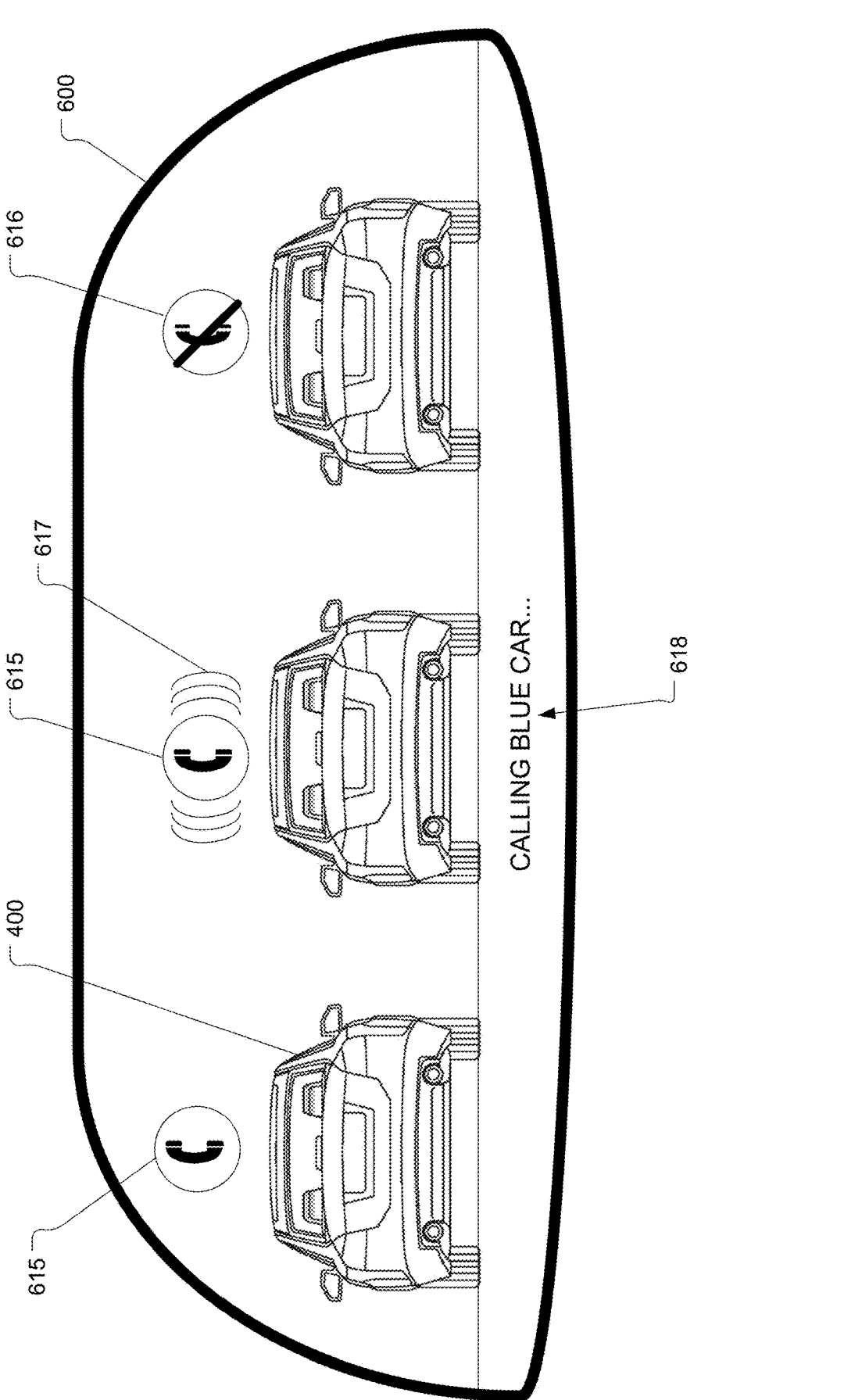
FIG. 23 depicts the augmented reality windshield of FIG. 22 displaying a notification on the windshield to inform the occupant that the call is being made.

FIG. 23 depicts the augmented reality windshield 600 of FIG. 22 displaying a call symbol 617 and/or a textual notification 618 on the windshield 600 to inform the occupant that the call is being made. It will be appreciated that any other symbol or notification may be used. An audible ringing sound may optionally be played. An externally visible light on the vehicle 10 may blink to indicate to an occupant of the nearby vehicle 400 that the occupant of the vehicle 10 is initiating a call.

Figure 24:
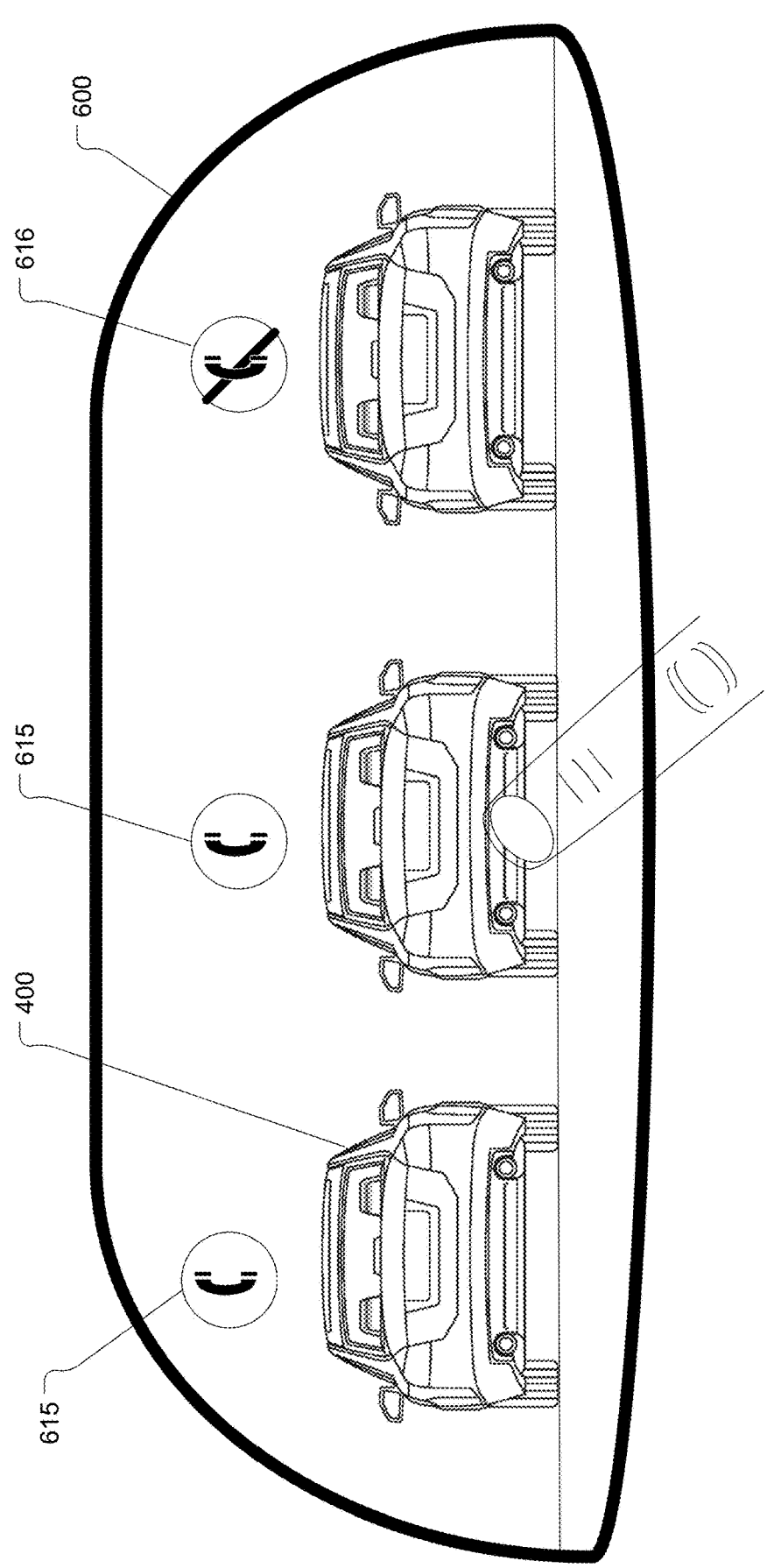
FIG. 24 depicts a touch-sensitive augmented reality windshield enabling the occupant to touch the windshield to call one of the other vehicles.

FIG. 24 depicts a touch-sensitive augmented reality windshield 600 enabling the occupant to touch the windshield 600 to call one of the other vehicles 400. FIG. 24 shows a finger of the occupant touching the windshield at a visual location where the nearby vehicle appears visible to thereby initiate a call or communication with this particular nearby vehicle.

Figure 25:
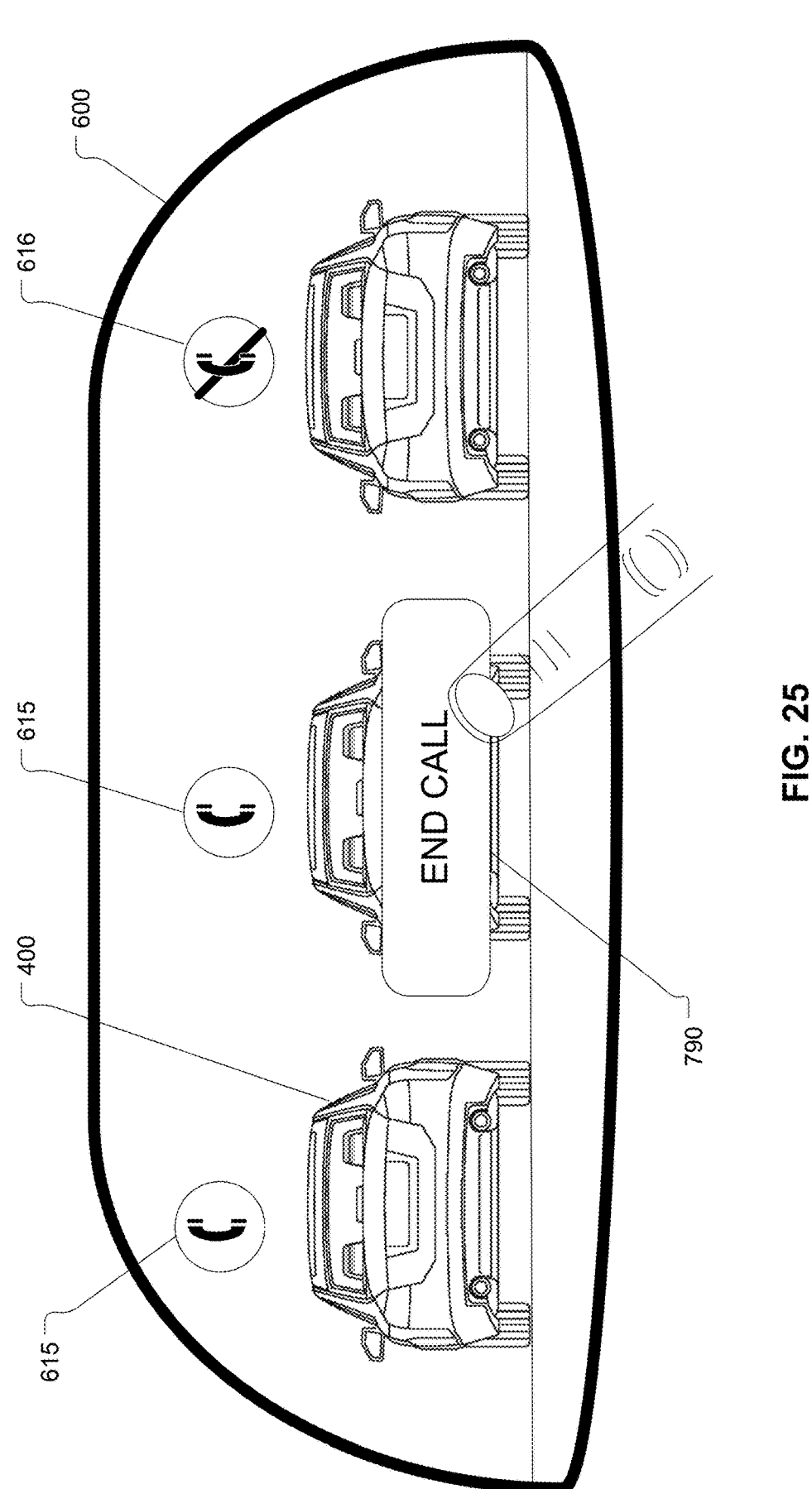
FIG. 25 depicts the touch-sensitive augmented reality windshield of FIG. 24 once a call is being made.

FIG. 25 depicts the touch-sensitive augmented reality windshield 600 of FIG. 24 once a call is being made. In the embodiment of FIG. 24, the windshield 600 displays an end call button 790. Touching this end call button will terminate the call. As will be appreciated, other call functions or features may be provided with suitable buttons or user interface elements. For example, a call forward button may be provided to forward a call. A conference call button may be provided to enable the occupant to create a conference call by adding multiple callers to the same call.

Figure 26:
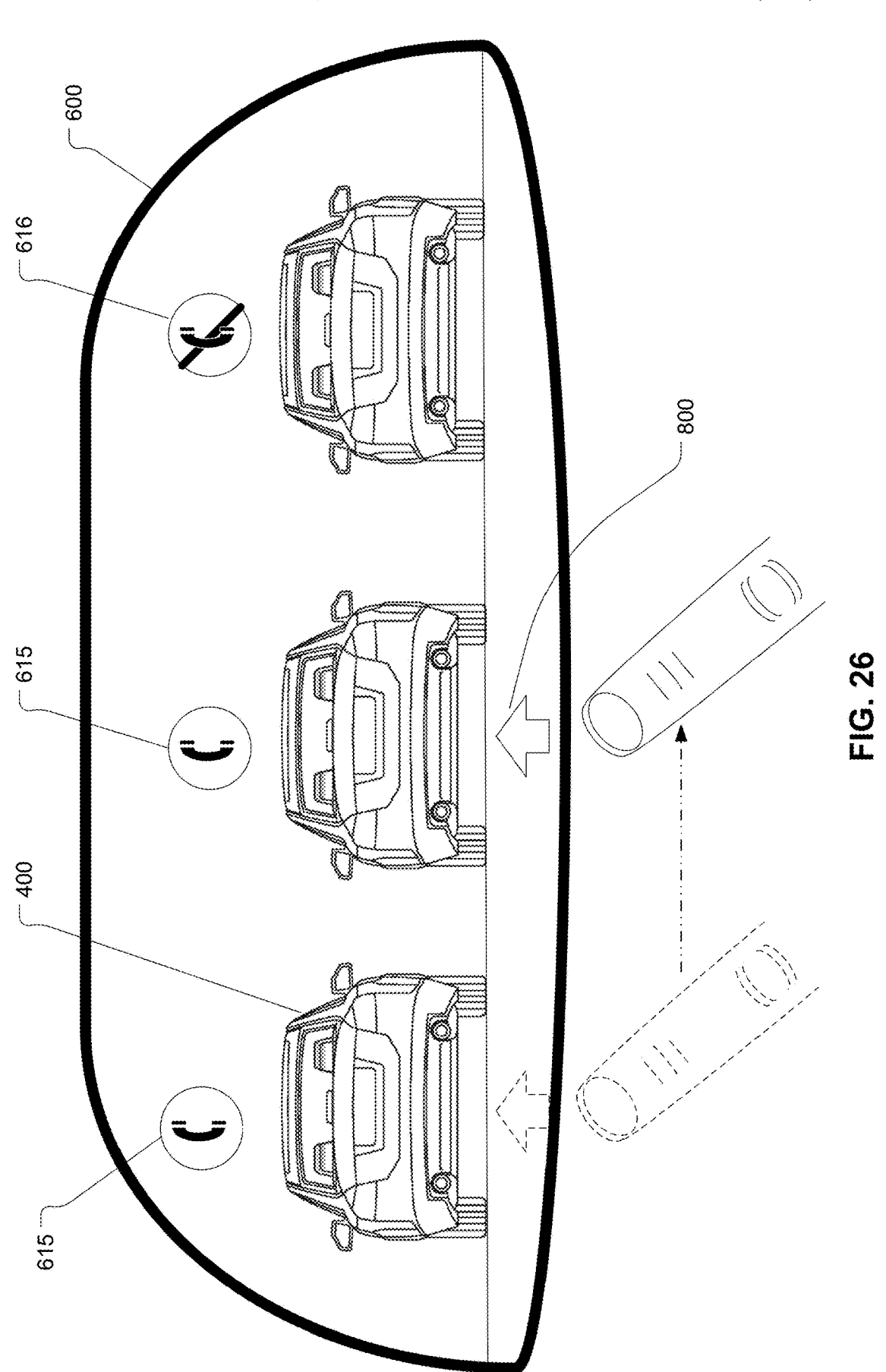
FIG. 26 depicts a gesture-based augmented reality windshield enabling an occupant to select by a gesture which of the other vehicles to call.

FIG. 26 depicts a gesture-based augmented reality windshield 600 enabling an occupant to select by a gesture which of the other vehicles to call. The gesture is detected by a gesture-recognizing device (e.g. gesture-recognizing camera or such sensor) that converts the occupant's gesture into user input to move or change a user selection of one of the nearby vehicles 400. In this example, the gesture moves the selection from the left vehicle to the center vehicle. The selection in this example is indicated by a visual indicator 800. The visual indicator in this example is an arrow. Any other suitable visual indicator may be used in lieu of the arrow.

In one particular use case, the embodiments described above may be useful to facilitate safe and efficient interactions with police or law enforcement. This technology can be used by citizen (drivers or occupants of vehicles) to ask for help from police in a nearby police car without having to call 911 or call the police (or to try to get the police's attention by honking, waving or gesticulating). The police can use this technology to safely and efficiently interact with a driver or occupant of a vehicle. Ordinarily, to communicate with an occupant of a vehicle, the police have to signal to the driver to pull over the vehicle to the side of the road, which can lead to misunderstandings and traffic issues. Also, roadside stops are known to cause anxiety and expose police to danger. Such situations have been known to escalate unnecessarily. This technology thus enables police to speak to occupants of nearby vehicles from the safety of their respective vehicles without having to pull over the vehicle, exit the vehicle and get physically close to the driver. Also exiting from a vehicle stopped on the side of a highway or busy road can be dangerous due to the risk of being hit by the ongoing traffic.

Figure 27:
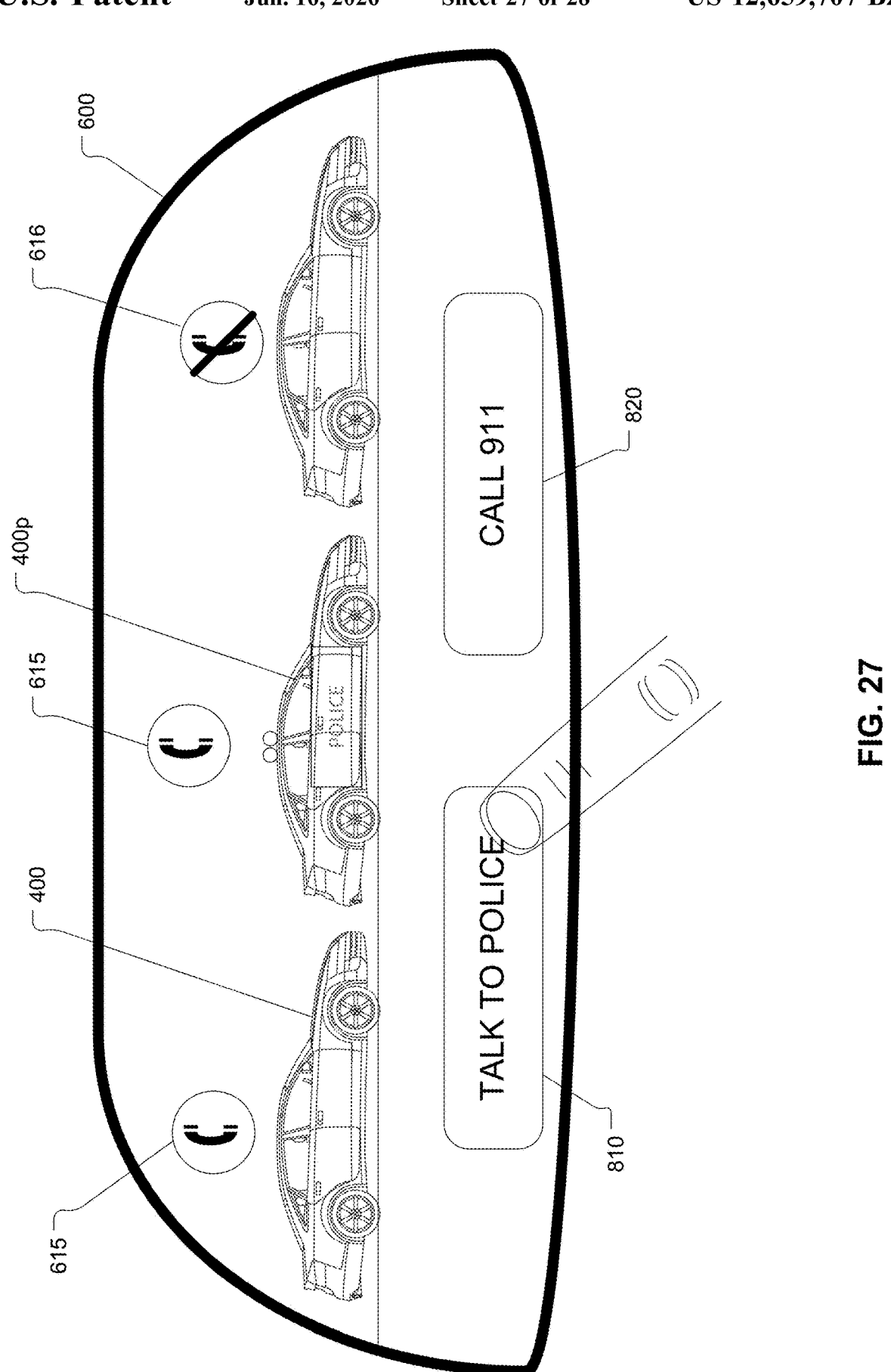
FIG. 27 depicts an augmented reality windshield for calling a police car.

FIG. 27 depicts an augmented reality windshield 600 for calling a police car 400p. In this example, the occupant sees a police car 400p nearby through the windshield 600. The occupant initiates a communication with the police officer in the police car 400p by touching user interface element 810 ("talk to police"). This initiates a call to the police car 400p nearby. The windshield may optionally also display a call 911 button 820 or other such user interface element. This can be useful if the police car is unresponsive and the occupant is dealing with an emergency. In one embodiment, the touching the talk to police 810 button sends a message to the remote server to initiate a call to the police car nearby. This may be done as described above if the police car has been identified by scanning its license plate or by receiving a V2V ID beacon. However, in some cases, the police car has not been identified by the vehicle 10. The vehicle 10 sends it current location data to the remote server 250. The remote server looks up the identification of the police car that at the same current location as the vehicle 10 and then either returns the phone number or establishes a call (e.g. VoIP call) without providing a phone number. In one embodiment the call to the police car may require that the occupant transmit full information about the occupant, e.g. occupant name, address, license plate, driver's license, VIN number, etc.

Figure 28:
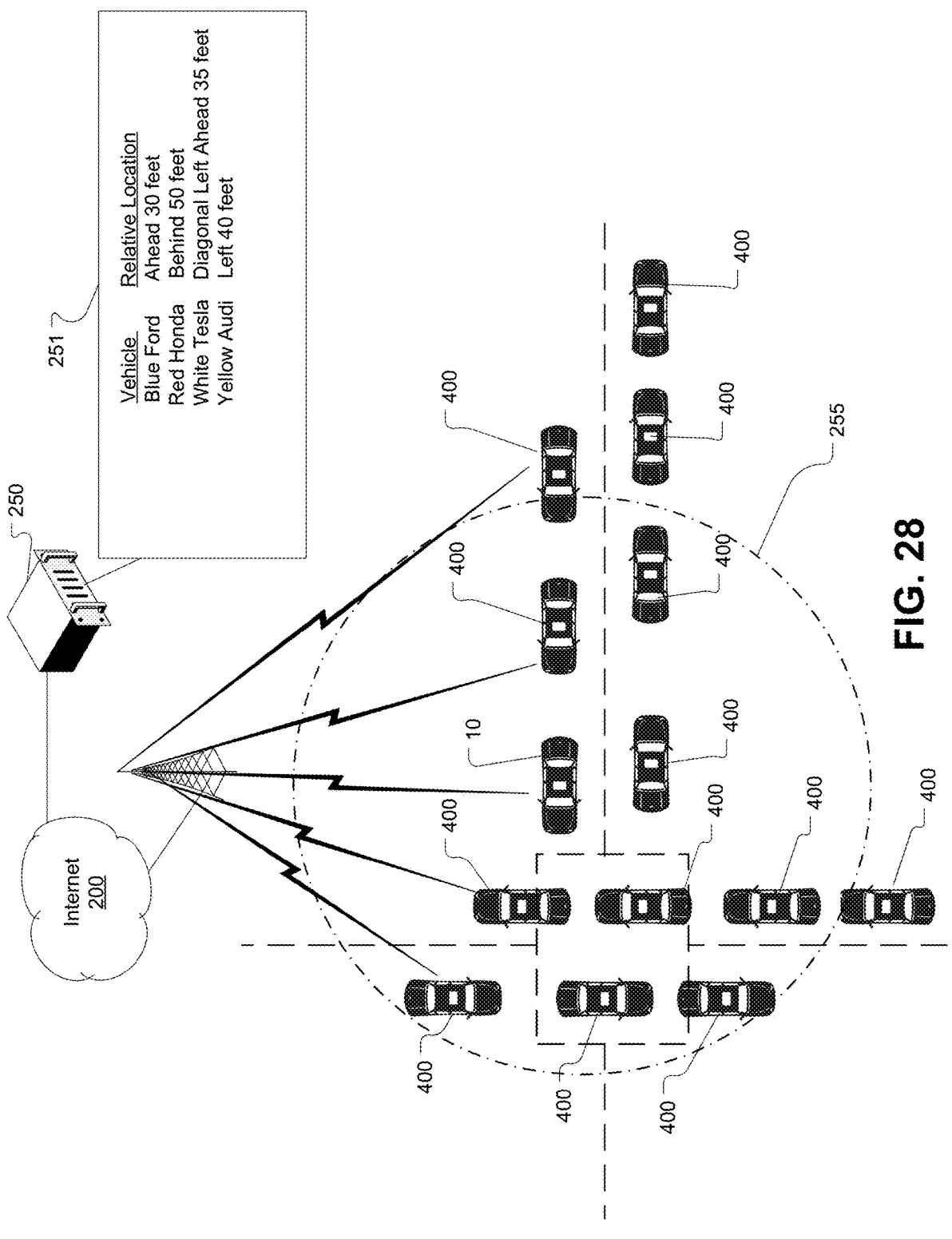
FIG. 28 depicts a vehicle looking up the identification of nearby vehicles based on make and color by querying a remote server.

In one implementation, as depicted by way of example in FIG. 28, the vehicle 10 interacts with the remote server 250 to look up the identification of a nearby vehicle 400 based on its make and color. In this implementation, the vehicle may be unable to scan license plates or to identify the nearby vehicles using V2V ID beacons. In this implementation, for example, there may be many nearby vehicles in heavy traffic each broadcasting their respective V2V ID beacons, making it impossible or at least very difficult to distinguish one vehicle's beacon from another. In that case, the vehicle 10 may transmit its current location, e.g. GNSS location data, to the remote server 250 which has a database 251 for storing nearby vehicle visual identification data such as make and color. The vehicle 10 then receives from the remote server a reply message providing a list of all of the available vehicles within a predetermined communication radius 255. The predetermined communication radius 255 may be user specified and/or it may also vary depending on vehicle speed, traffic density, etc. The predetermined communication radius 255 may be transmitted as part of the query message or it may have been previously stored by the server based on a previous interaction with the vehicle 10 or its occupant(s). The list of all available vehicles 400 within the predetermined communication radius 255 includes in this embodiment the visual identification data, e.g. make, mode, color, type of vehicle, etc. Other data for the nearby vehicles may include directions of travel, speeds and their relative locations (which may be determined from the nearby vehicles' GNSS data). In one implementation, the vehicle 10 uses its onboard camera(s) and an image-recognition module executed by a vehicle processor to identify all of the nearby vehicles 400 willing to communicate based on their visual identification data and/or relative locations. The occupant of the vehicle 10 can thus initiate a communication or call with any of the available nearby vehicles 400 by using the user input techniques described above (voice commands, touch input, gesture input, etc.) As an example, the remote server may send a reply message to the vehicle 10 to indicate that there are four nearby vehicles 400 which have communication availability. In the example of FIG. 28, these are a blue Ford, a red Honda, a white Tesla, and a yellow Audi. Communication data for each of these vehicle are also transmitted to the vehicle 10. The vehicle 10 uses its camera (a) to capture images surrounding the vehicle. The vehicle uses a processor to visually identify the nearby vehicles and to correlate each of the nearby vehicles with the visual identification data received from the remote server. Thus, for example, the vehicle 10 captures surrounding camera images showing the blue Ford, the red Honda, the white Tesla, and the yellow Audi, recognizes the vehicles using image recognition software and correlates those recognized vehicles from the camera images with the visual identification data received from the remote server, i.e. the vehicle processor matches the vehicles in the captured camera images with the visual identification data of the vehicles supplied by the remote server. Subsequently, the occupant can initiate a communication with any of these four nearby vehicles simply by providing user input to the vehicle 10, e.g. by voice command, gesture/pointing or touch input. The database 251 is incorporated within or accessible by the remote server 250.

The database as depicted by way of example in FIG. 28 may also store relative locations of the nearby vehicles 400. This requires that the remote server 250 receive continual or at least highly frequent location updates from each of the nearby vehicles 40. In this implementation, each of the nearby vehicles 400 shares its GNSS location data or data from any other onboard positioning device with the remote server 250, e.g. by transmitting updates over the air via cellular data link. The vehicle 10 can query the remote server 250 to obtain real-time, or nearly real-time, positioning data of the nearby vehicles 400 from which relative locations can be computed by determining the location of each nearby vehicle relative to the current location of the vehicle 10. Relative locations can be determined either by the vehicle 10 or by the remote server 250 and then transmitted to the vehicle 10. In the case of the vehicle 10 determining the relative locations, the remote server 250 shares the location data of the nearby vehicles 400 with the vehicle 10 to enable the vehicle 10 to compute the relative locations of the nearby vehicles 400. In the case of the remote server 250 determining the relative locations of the nearby vehicles 400, the vehicle 10 shares its current location with the remote server 250 and the remote server computes the relative locations based on the current locations of the vehicle and each of the nearby vehicles 400. The remote server 250 then transmits the relative locations of the nearby vehicles 400 the vehicle 10. For example, as shown in FIG. 28, the database 251 may store relative locations as follows: the blue Ford is 30 feet directly ahead, the red Honda is 50 feet behind, the white Tesla is located diagonally left ahead 35 feet and the yellow Audi is located 40 feet to the left. These are merely examples to illustrate relative locations. The relative locations may be used on their (independently of make and color) to identify the nearby vehicles in the surrounding camera images. However, it will be appreciated that the relative locations may be used with the make and color (and any other visual identification data) to identify the nearby vehicles in the surrounding camera images. Using both visual identification data and relative locations is the best way to accurately correlate the nearby vehicles in the camera images with the data received from the remote server, particularly at night or lowlight conditions, in heavy rain or snow, or in situations where there are similar nearby vehicles, e.g. two nearby blue Fords or two nearby white Teslas.

These methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps. These method steps may be implemented as software, i.e. as coded instructions stored on a computer readable medium which performs the foregoing steps when the computer readable medium is loaded into memory and executed by the microprocessor of the computing device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc. For the purposes of this specification, the expression "module" is used expansively to mean any software, hardware, firmware, or combination thereof that performs a particular task, operation, function or a plurality of related tasks, operations or functions. When used in the context of software, the module may be a complete (standalone) piece of software, a software component, or a part of software having one or more routines or a subset of code that performs a discrete task, operation or function or a plurality or related tasks, operations or functions. Software modules have program code (machine-readable code) that may be stored in one or more memories on one or more discrete computing devices. The software modules may be executed by the same processor or by discrete processors of the same or different computing devices.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A vehicle comprising:
a Global Satellite Navigation System (GNSS) receiver to determine a current location of the vehicle;
a radiofrequency cellular transceiver cooperating with the processor to transmit the current location of the vehicle to a remote server and to receive a communication-availability reply message from the remote server providing visual identification data and communication availability data for nearby vehicles;
a microphone to capture a voice command of a user;
a processor executing a speech recognition module to process the voice command from the user to determine that the user is requesting that a call be initiated with one of the nearby vehicles and to determine a relative position of the one of the nearby vehicles from the voice command of the user; and
a camera capturing images of the nearby vehicles, wherein the processor cooperates with the camera to identify the one of the nearby vehicles with which the user wishes to initiate the call by correlating the relative position with the visual identification data;

wherein the processor cooperates with the radiofrequency cellular transceiver or with a short-range vehicle-to-vehicle transceiver of the vehicle to initiate a voice communication with the one of the nearby vehicles with which the user wishes to initiate the call.

2. The vehicle of claim 1 wherein the visual identification data comprises one or more of a vehicle type, make, model or color.

3. The vehicle of claim 1 comprising an information-displaying windshield for displaying an augmented-reality overlay on the windshield displaying call availability symbols for the nearby vehicles, wherein the call availability symbols indicate a communication availability or a communication unavailability of the nearby vehicles.

4. The vehicle of claim 1 comprising an information-displaying windshield for displaying an augmented-reality overlay on the windshield highlighting the one of the nearby vehicles with which the call is to be initiated.

5. The vehicle of claim 4 comprising a gesture-recognizing device that recognizes a gesture of the user to select and highlight another one of the nearby vehicles.

6. The vehicle of claim 1 wherein the radiofrequency cellular transceiver transmits a communication radius to the remote server, wherein the communication radius is based on vehicle speed and traffic density.

7. The vehicle of claim 1 wherein the processor is configured to further identify the one of the nearby vehicles based on a direction of travel received from the remote server.

8. A vehicle comprising:
a Global Satellite Navigation System (GNSS) receiver to determine a current location of the vehicle;
a radiofrequency cellular transceiver cooperating with the processor to transmit the current location of the vehicle to a remote server and to receive a communication-availability reply message from the remote server providing visual identification data and communication availability data for nearby vehicles;
a microphone to capture a voice command of a user;
a processor executing a speech recognition module to process the voice command from the user to determine that the user is requesting that a call be initiated with one of the nearby vehicles and to determine from the voice command of the user a user-specified visual identification of the one of the nearby vehicles to call; and
a camera capturing images of the nearby vehicles, wherein the processor cooperates with the camera to identify the one of the nearby vehicles with which the user wishes to initiate the call by correlating the user-specified visual identification with the visual identification data from the remote server;
wherein the processor cooperates with the radiofrequency cellular transceiver or with a short-range vehicle-to-vehicle transceiver of the vehicle to initiate a voice communication with the one of the nearby vehicles with which the user wishes to initiate the call.

9. The vehicle of claim 8 wherein the visual identification data comprises one or more of a vehicle type, make, model or color.

10. The vehicle of claim 8 comprising an information-displaying windshield for displaying an augmented-reality overlay on the windshield displaying call availability symbols for the nearby vehicles, wherein the call availability symbols indicate a communication availability or a communication unavailability of the nearby vehicles.

11. The vehicle of claim 8 comprising an information-displaying windshield for displaying an augmented-reality overlay on the windshield highlighting the one of the nearby vehicles with which the call is to be initiated.

12. The vehicle of claim 11 comprising a gesture-recognizing device that recognizes a gesture of the user to select and highlight another one of the nearby vehicles.

13. The vehicle of claim 8 wherein the radiofrequency cellular transceiver transmits a communication radius to the remote server, wherein the communication radius is based on vehicle speed and traffic density.

14. The vehicle of claim 8 wherein the processor is configured to further identify the one of the nearby vehicles based on a direction of travel received from the remote server.

15. A vehicle comprising:
a Global Satellite Navigation System (GNSS) receiver to determine a current location of the vehicle;
a microphone to capture a voice command of a user;
a processor executing a speech recognition module to process the voice command from the user to determine that the user is requesting that a call be initiated a nearby vehicle and to determine from the voice command of the user a visual identification of the nearby vehicle to call; and
a radiofrequency cellular transceiver cooperating with the processor to transmit the visual identification of the nearby vehicle and the current location to the remote server and to receive from the remote server a communication-availability of the nearby vehicle;
wherein the processor cooperates with the radiofrequency cellular transceiver or with a short-range vehicle-to-vehicle transceiver of the vehicle to initiate a voice communication with the one of the nearby vehicles with which the user wishes to initiate the call.

16. The vehicle of claim 15 wherein the visual identification comprises one or more of a vehicle type, make, model or color.

17. The vehicle of claim 15 comprising an information-displaying windshield that presents a notification that the call is being initiated, wherein the notification displays the visual identification of the nearby vehicle.

18. The vehicle of claim 15 comprising an information-displaying windshield that presents a busy notification that the nearby vehicle is already on another call.

19. The vehicle of claim 18 comprising an information-displaying windshield presents a user interface element to send an emergency message to the nearby call.

20. The vehicle of claim 15 wherein the voice communication is a VoIP call.

* * * * *